United States Patent
Kaneko et al.

(10) Patent No.: US 8,577,512 B2
(45) Date of Patent: *Nov. 5, 2013

(54) ENERGY SUPPLY SYSTEM

(75) Inventors: Hiroaki Kaneko, Osaka (JP); Hideo Ohara, Osaka (JP); Masataka Ozeki, Osaka (JP); Yoshikazu Tanaka, Shiga (JP); Kunihiro Ukai, Nara (JP)

(73) Assignee: Panasonic Corporation, Osaka (JP)

( * ) Notice: Subject to any disclaimer, the term of this patent is extended or adjusted under 35 U.S.C. 154(b) by 363 days.

This patent is subject to a terminal disclaimer.

(21) Appl. No.: 13/060,591

(22) PCT Filed: Mar. 4, 2010

(86) PCT No.: PCT/JP2010/001482
§ 371 (c)(1),
(2), (4) Date: Feb. 24, 2011

(87) PCT Pub. No.: WO2010/109782
PCT Pub. Date: Sep. 30, 2010

(65) Prior Publication Data
US 2011/0151346 A1 Jun. 23, 2011

(30) Foreign Application Priority Data
Mar. 23, 2009 (JP) .................. 2009-069469
Feb. 26, 2010 (JP) .................. 2010-041763

(51) Int. Cl.
G05D 3/12 (2006.01)
G05D 5/00 (2006.01)
G05D 9/00 (2006.01)
G05D 11/00 (2006.01)
G05D 17/00 (2006.01)

(52) U.S. Cl.
USPC ............... 700/295; 700/286; 700/297

(58) Field of Classification Search
USPC .................... 700/22, 286, 295, 197
See application file for complete search history.

(56) References Cited

U.S. PATENT DOCUMENTS

| 4,634,843 | A * | 1/1987 | Payne ................... 219/486 |
| 6,434,957 | B1 * | 8/2002 | Nishizuka et al. ....... 62/175 |
| 7,012,223 | B2 * | 3/2006 | Kopel .................. 219/494 |
| 7,101,816 | B2 * | 9/2006 | Kaushal et al. .......... 438/795 |

(Continued)

FOREIGN PATENT DOCUMENTS

| JP | 2003-061245 A | 2/2003 |
| JP | 2005-063903 A | 3/2005 |

(Continued)

OTHER PUBLICATIONS

International Search Report for International Application No. PCT/JP2010/001482, dated Apr. 27, 2010, 2 pages.

(Continued)

Primary Examiner — Ramesh Patel
(74) Attorney, Agent, or Firm — McDermott Will & Emery LLP

(57) ABSTRACT

An energy supply system comprises an energy supply device (1a) for supplying at least one of electric power and heat, and a controller (6) configured to set first maximum operation time which is an upper limit value of operation time of the energy supply device in a first specified period shorter than a guaranteed operation period of the energy supply device such that operation time of the energy supply device does not reach operation time life before the guaranteed operation period lapses, and calculate and set second maximum operation time which is an upper limit value of the operation time of the energy supply device in a second specified period shorter than the first specified period based on the set first maximum operation time such that the operation time of the energy supply device within the first specified period does not exceed the first maximum operation time.

16 Claims, 13 Drawing Sheets

(56) References Cited

U.S. PATENT DOCUMENTS

| | | | |
|---|---|---|---|
| 7,155,318 B2 * | 12/2006 | Sharma et al. | 700/276 |
| 7,444,096 B2 * | 10/2008 | Lowman et al. | 399/88 |
| 7,833,669 B2 * | 11/2010 | Aso et al. | 429/428 |
| 7,984,628 B2 * | 7/2011 | Nishio et al. | 68/12.01 |
| 8,209,040 B2 * | 6/2012 | Sekiai et al. | 700/47 |
| 2002/0021886 A1 | 2/2002 | Nakajima et al. | |

FOREIGN PATENT DOCUMENTS

| | | |
|---|---|---|
| JP | 2006-127967 A | 5/2006 |
| JP | 2007-309598 A | 11/2007 |
| JP | 2007-323843 A | 12/2007 |
| RU | 2233387 C2 | 7/2004 |
| RU | 2296232 C2 | 3/2007 |
| RU | 2338313 C2 | 11/2008 |
| RU | 2341857 C1 | 12/2008 |

OTHER PUBLICATIONS

Office Action from counterpart Russian Application No. 2011106927, dated Feb. 26, 2013, 13 pages (with translation).

* cited by examiner

ENERGY SUPPLY SYSTEM

TECHNICAL FIELD

The present invention relates to an energy supply system for supplying electric power, heat, etc.

BACKGROUND ART

As an energy supply system, a gas engine power generator and a gas engine energy supply system are conventionally known. In recent years, especially, a fuel cell system for supplying electric power and heat using a fuel cell has attracted an attention.

It is proposed that a life of the fuel cell system is set using operation time and the number of times of operation and the operation of the fuel cell system is forcibly stopped when the operation time of the fuel cell system reaches the life (see e.g., PTL 1).

An operation method of a fuel cell in which an operation plan of the fuel cell is created based on a service life is proposed (see e.g., PTL 2).

A method of planning an operation of a cogeneration apparatus is proposed, in which a load is predicted from a past load and an operation time period is determined based on the predicted load (see e.g., PTL 3).

PATENT LITERATURE

PTL 1: Japanese Laid-Open Patent Application Publication No. 2005-63903
PTL 2: Japanese Laid-Open Patent Application Publication No. 2007-323843
PTL 3: Japanese Laid-Open Patent Application Publication No. 2003-61245

SUMMARY OF THE INVENTION

Technical Problem

In conventional fuel cells and conventional cogeneration apparatuses, guaranteed operation periods are typically set, and it is undesired that their operation times reach their lives before the guaranteed operation periods lapse. In the above described conventional fuel cells and conventional cogeneration apparatuses, this is taken into account to a certain extent, but there is a likelihood that the lives of apparatuses will be shortened.

The present invention has been made under the circumstances, and an object of the present invention is to provide an energy supply system which can reduce a possibility that operation time reaches operation time life before a guaranteed operation period lapses and can increase a device life.

Solution to Problem

The inventors studied intensively to solve the above mentioned problem, and discovered the following.

For example, if start-up and stop occur frequently in a cogeneration system including a fuel cell, the life of the device may possibly be adversely affected. The above conventional fuel cells and conventional cogeneration apparatuses have prescribed lives and the number of times of start-up and stop or how start-up and stop affects the device lives are not taken into account, which possibly reduces the lives. Since the number of times of start-up and stop is closely related to the operation time, it is necessary to perform a proper operation while adjusting a relationship between them.

To solve the above described problem, an energy supply system of the present invention comprises an energy supply device for supplying at least one of electric power and heat; and a controller configured to set first maximum operation time which is an upper limit value of operation time of the energy supply device in a first specified period shorter than a guaranteed operation period of the energy supply device such that operation time of the energy supply device does not reach operation time life before the guaranteed operation period lapses, and calculate and set second maximum operation time which is an upper limit value of operation time of the energy supply device in a second specified period shorter than the first specified period based on the set first maximum operation time such that the operation time of the energy supply device within the first specified period does not exceed the first maximum operation time.

In such a configuration, the life of the device can be increased while reducing a possibility that the operation time of the energy supply device reaches the operation time life before the guaranteed operation period lapses.

The above and further objects, features and advantages of the present invention will more fully be apparent from the following detailed description of preferred embodiments with reference to accompanying drawings.

Advantageous Effects of Invention

The energy supply system of the present invention can continue an operation while preventing the operation time from reaching the operation time life before the guaranteed operation period lapses.

DETAILED DESCRIPTION OF THE PREFERRED EMBODIMENTS

Figure 1:
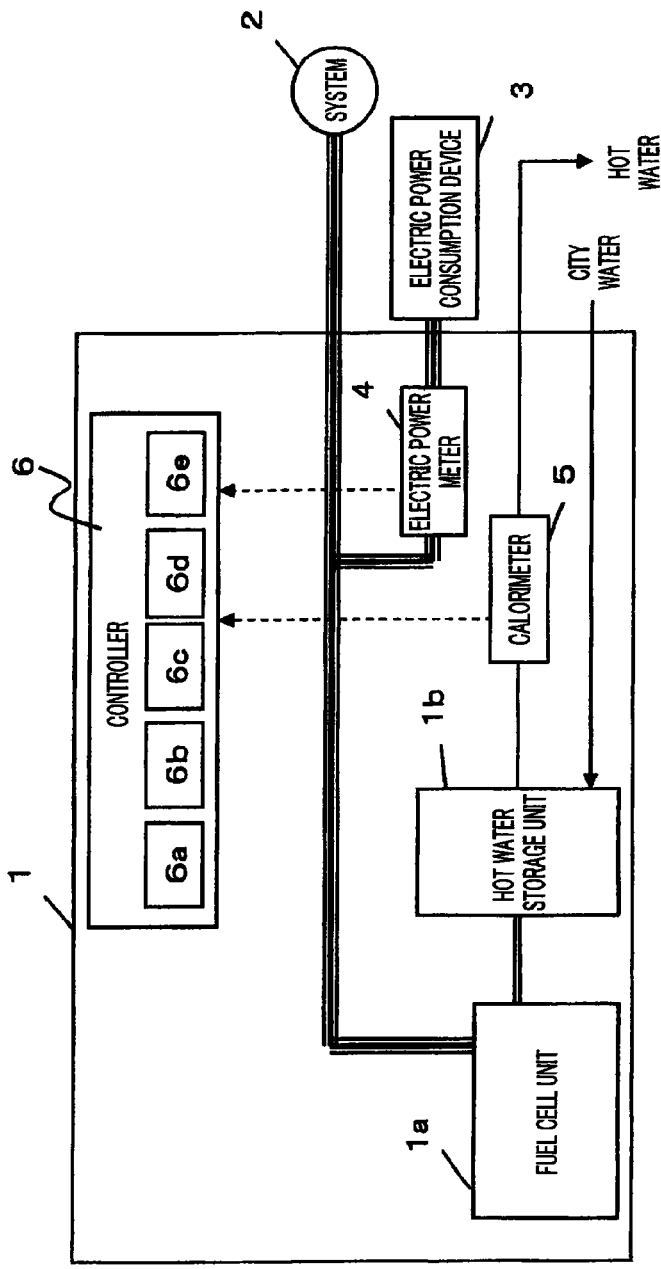
FIG. 1 is a block diagram showing a configuration example of an energy supply system according to Embodiment 1 of the present invention.

Hereinafter, embodiments of the present invention will be described with reference to the drawings.

An energy supply system according to embodiments of the present invention includes an energy supply device (e.g., fuel cell unit 1a in FIG. 1) for supplying at least one of electric power and heat, and a controller (e.g., controller 6 in FIG. 1) configured to set first maximum operation time which is an upper limit value of operation time of the energy supply device in a first specified period shorter than a guaranteed operation period of the energy supply device such that operation time of the energy supply device does not reach operation time life before the guaranteed operation period lapses, and calculate and set second maximum operation time which is an upper limit value of operation time of the energy supply device in a second specified period shorter than the first specified period based on the set first maximum operation time such that the operation time of the energy supply device within the first specified period does not exceed the first maximum operation time.

In such a configuration, the life of the device can be increased while reducing a possibility that the operation time reaches the operation time life before the guaranteed operation period lapses.

In the energy supply system, the controller may be configured to operate the energy supply device such that the number of times of start-up and stop within the second specified period is limited to less than a predetermined number of times.

In the energy supply system, the first maximum operation time may be a constant value.

In the energy supply system, the controller may be configured to change the first maximum operation time according to a predetermined condition.

In the energy supply system, the predetermined condition may be at least one of calendar information, season information, an outside air temperature, and a city water temperature.

In the energy supply system, the first specified period may be one of n day(s), n week(s), n month(s), and n year(s) when n is a natural number.

In the energy supply system, the second specified period may be one of n hour(s), n day(s), n week(s), n month(s) and n year(s) when n is a natural number.

In the energy supply system, the controller may be configured to change the first specified period according to a predetermined pattern.

In the energy supply system, the controller may be configured to set the first maximum operation time and the second maximum operation time such that an energy cost reduction amount per unit operation time is maximum.

In the energy supply system, the controller may be configured to set the first maximum operation time and the second maximum operation time such that a consumed energy amount of the energy supply device is minimum.

In the energy supply system, the controller may be configured to set the first maximum operation time and the second maximum operation time such that a consumed energy reduction amount of an object to which the energy supply device supplies energy is maximum.

The energy supply system may comprise an operation device (e.g., remote controller 7 of FIG. 10) via which a start-up time and a stop time of the energy supply device are input, and the controller may be configured to set the start-up time and the stop time which are input via the operation device, as a device start-up time and a device stop time which are a start-up time and a stop time of the energy supply device, respectively, if time from the start-up time input via the operation device to the stop time input via the operation device does not exceed the second maximum operation time, and not to set the start-up time and the stop time which are input via the operation device, as the device start-up time and the device stop time, if the time from the start-up time input via the operation device to the stop time input via the operation device exceeds the second maximum operation time.

The energy supply system may comprise an informing device configured to inform that, if the time from the start-up time input via the operation device to the stop time input via the operation device exceeds the second maximum operation time, the time exceeds the second maximum operation time.

In the energy supply system, the controller may be configured to update the first maximum operation time based on an integrated operation time of the energy supply device.

In the energy supply system, the controller may be configured to calculate and integrate a difference between the second maximum operation time and the operation time of the energy supply device within the second specified period to obtain an integrated surplus operation time and store the integrated surplus operation time when the operation time of the energy supply device within the second specified period is shorter than the second maximum operation time.

In the energy supply system, the controller may be configured to reconfigure the first maximum operation time when the integrated surplus operation time reaches a preset third specified period.

As the "energy supply device" in this embodiment, a fuel cell is suitably used, and a power generator of an internal combustion engine type, etc may be used.

Embodiment 1

FIG. 1 is a block diagram showing a configuration example of an energy supply system according to Embodiment of the present invention. A fuel cell system is shown as an example of the energy supply system.

An energy supply system 1 of this embodiment includes a fuel cell unit 1a for generating electric power using a fuel cell, and a hot water storage unit 1b which converts city water to hot water by increasing its temperature using heat generated by power generation of a fuel cell in the fuel cell unit 1a, and stores the hot water. The energy supply system 1 supplies electric power generated in the fuel cell unit 1a to an electric power consumption device 3 together with electric power from an electric power system 2.

An electric power load amount consumed by the electric power consumption device 3 is measured by an electric power meter 4 and sequentially stored in a memory 6a of a controller 6.

The hot water stored in the hot water storage unit 1b is supplied as the hot water via a faucet or the like. A heat load amount used as the hot water is measured by a calorimeter 5 and sequentially stored in the memory 6a of the controller 6.

The calorimeter 5 includes, for example, a temperature sensor (not shown) for measuring a city water temperature, a temperature sensor (not shown) for measuring the temperature of the hot water supplied from the hot water storage unit 1b, and a flow meter (not shown) for measuring the flow rate of the hot water supplied from the hot water storage unit 1b, and is configured to calculate the heat load amount used as the hot water, from a product of a temperature difference between the city water and the hot water and the flow rate of the hot water.

The fuel cell system 1 includes a backup hot water supply device (not shown) to supply the hot water when the hot water in the hot water storage unit 1b has run out.

The controller 6 is configured to control the operation of the fuel cell unit 1a and the operation of the energy supply system 1.

The controller 6 further includes a demand predictor 6b for predicting time series patterns of future electric power load demand and future heat load demand from a past history of electric power load demand and a past history of heat load demand which are stored in the memory 6a, an operation planning device 6c for determining a start-up time and a stop time of the fuel cell system based on the time series patterns of electric power load demand and heat load demand which are predicted by the demand predictor 6b, an operation planning device 6d for setting maximum operation time during which the fuel cell system is operative, in a specified period (e.g., 1 day), and a period setting device 6e for setting the specified period.

The demand predictor 6b reads a history of heat load demand and history of electric power load demand in a specified period (e.g., 1 year) which are stored in the memory 6a, estimates and calculates predicted demand of electric power load which changes with a lapse of time in a future specified period (e.g., 1 day) and predicted demand of heat load which changes with a lapse of time in the future specified period (e.g., 1 day) (hereinafter these are "predicted electric power load demand" and "predicted heat load demand"), based on the read histories, and sequentially stores in the memory 6a, the predicted electric power load demand and the predicted heat load demand.

The storage period of past electric power load for estimating the predicted electric power load demand and the storage period of heat consumption history of heat load necessary for estimating the predicted heat load demand are desirably periods in which the system can properly grasp consumption cycles of electric power and heat in an object for which the fuel cell system 1 of this embodiment is installed. For example, in a case where the fuel cell system 1 is installed at home, the storage period is about several days to several months.

Various methods for estimating the predicted electric power load demand and the predicted heat load demand from the history of electric power load and the history of heat load have been proposed in the past, and will not be described in detail.

The operation planning device 6d sets first maximum operation time which is an upper limit value of the operation time of the fuel cell unit 1a in a first specified period (e.g., 1 week) shorter than the guaranteed operation period (e.g., 10 years) of the fuel cell unit 1a such that the operation time of the fuel cell unit 1a does not reach operation time life (e.g., 40000 hours) of the fuel cell unit 1a before the guaranteed operation period lapses, and calculates and sets second maximum operation time which is an upper limit value of the operation time of the fuel cell unit 1a in a second specified period (e.g., 1 day) shorter than the first specified period such that the operation time of the fuel cell unit 1a within the first specified period does not exceed the first maximum operation time, based on the set first maximum operation time.

In such a configuration, reduction of a possibility that the operation time of the fuel cell unit 1a reaches the operation time life before the guaranteed operation period lapses and suppressing of reduction of a device life can be fulfilled together.

The controller 6 operates the fuel cell unit 1a such that the operation time of the fuel cell unit 1a in the second specified period does not exceed the second maximum operation time. To be specific, for example, the controller 6 sets one start-up time and one stop time of the fuel cell unit 1a such that the operation time of the fuel cell unit 1a in the second specified period does not exceed the second maximum operation time. In other words, time from the start-up time to the stop-time is planned operation time, and it is sufficient that the planned operation time is set not to exceed the second maximum operation time. In this case, for example, the start-up time and the stop time in the second specified period may be determined such that an energy cost reduction amount described later is maximum and the time from the start-up time to the stop time is the second maximum operation time. The start-up time and the stop time may be determined such that the time from the start-up time to the stop time is shorter than the second maximum operation time rather than being equal to the second maximum operation time. A specific method for determining the start-up time and the stop time may be suitably referred to Modification Examples described later.

For example, it is supposed that the guaranteed operation period (product life) is 10 years, the operation time life (endurance time) is 40000 hours, the first specified period is 1 week and the second specified period is 1 day. In this case, the first maximum operation time may be, for example, 40000 hours÷521.4 weeks=76.7 hours/week, based on 10 years=521.4 weeks. The second maximum operation time may be, for example, a specified time which is not shorter than 7.7 hours and not longer than 20 hours. To increase an efficiency, it is preferred that the second maximum operation time be set not less than a certain lower limit value (e.g., 7.7 hours).

The first maximum operation time may be input by an operator and may be stored in a memory (not shown) in the controller 6. Or, the controller 6 may automatically obtain the first maximum operation time by calculation based on the guaranteed operation period, the operation time life and the first specified period. In latter case, the guaranteed operation period, the operation time life and the first specified period may be input by the operator, for example, and stored in the memory (not shown) in the controller 6. The first maximum operation time may be calculated according to the following formula (1).

First Maximum Operation Time=Operation Time Life/(Guaranteed Operation Period/First Specified Period)     (1)

The controller 6 can automatically obtain the second maximum operation time by calculation based on the set first maximum operation time.

Table 1 shows an example of the second maximum operation time set by the controller 6 in a case where the first specified period is 1 week, the second specified period is 1 day, and the first maximum operation time is 76.7 hours.

TABLE 1

|  | Second Specified Period | | | | | | |
| --- | --- | --- | --- | --- | --- | --- | --- |
|  | Sunday | Monday | Tuesday | Wednesday | Thursday | Friday | Saturday |
| Second Maximum Operation Time | 16 h | 10 h | 9 h | 11 h | 9 h | 7.7 h | 14 h |

As can be seen from Table 1, the first specified period is divided into a plurality of second specified periods, and the second maximum operation time in each of the second specified periods is set such that a total of the second maximum operation times in all of the second specified periods belonging to the same first specified period is equal to or shorter than the first maximum operation time in this first specified period. The second specified period in Table 1 is 24 hours which starts from 0 a.m. (midnight) in each 1 day and ends at 0 a.m. (midnight) in the next day, but is not limited to this in the present invention.

The controller 6 causes the fuel cell unit 1a to start-up and stop. In this case, the controller 6 causes the fuel cell unit 1a to start-up and stop such that the operation time in the second specified period is equal to the second maximum operation time. It should be noted that if there is any intervention of the operator and the like, the fuel cell unit 1a may stop and re-start-up. It is preferred that the controller 6 limit the number of times of start-up and stop in the second specified period to less than predetermined number of times (less than 3 times, i.e., twice or less). This makes it possible to surely suppress reduction of the device life which would be caused by excessively repeated start-up and stop.

By associating the setting of the maximum operation time with limiting of the number of times of start-up and stop in the manner as described above, reduction of a possibility that the operation time of the fuel cell unit 1a reaches the operation time life before the guaranteed operation period lapses and suppressing of reduction of the device life can be fulfilled together and more surely.

It is preferred that the second specified period is a period obtained by dividing the first specified period by a natural number n. In the above example, n is 7.

It is more preferred that the number of times of start-up and stop in the second specified period be limited to once. To be specific, it is preferred that the controller 6 start-up the fuel cell unit 1a only once and stop the fuel cell unit 1a only once in the second specified period such that the operation time of the fuel cell unit 1a in the second specified period does not exceed the second maximum operation time. The fuel cell unit 1a may or may not be configured to be always in a stopped state at a time point between a certain second specified period and a next second specified period. In a former case, the fuel cell unit 1a stops the operation at least once without fail in the second specified period. Because of such regular stop of the operation, the life of the fuel cell unit 1a is increased. In a latter case, a specific start-up time and a specific stop time and their time-series relation may not be particularly limited so long as operation time in a certain second specified period does not exceed the corresponding second maximum operation time.

The controller 6 may obtain the first maximum operation time and/or the second maximum operation time while considering various factors such as predicted load demand or an energy cost reduction amount. Hereinafter, a method of setting the maximum operation time in a case where the energy cost reduction amount is maximum will be described.

It is assumed that the following conditions are satisfied. The term "power generation efficiency of fuel cell" refers to a ratio of energy (calories) of electric power obtained by power generation with respect to energy (calories) of a gas supplied to the fuel cell. The term "hot water supply efficiency of fuel cell" refers to a ratio of energy (calories) of hot water obtained by a by-product resulting from power generation with respect to the energy (calories) of the gas supplied to the fuel cell.

Gas Rate: A [Japanese Yen/kWh]
Electricity Rate: B [Japanese Yen/kWh]
Calories of Hot Water Consumed at Home: C [kWh]
Power Generation Efficiency of Fuel Cell: $\alpha$
Hot Water Supply Efficiency of Fuel Cell: $\beta$
Efficiency of Conventional Hot Water Supply Device: $\gamma$ The amount of gas consumed in the fuel cell to supply hot water of calories C (referred to as calories required for hot water supply which is obtained by a temperature difference between hot water and city water (tap water), and the volume of hot water or city water) is $C/\beta$ [kWh]. The gas rate is $A \times C/\beta$ [Yen]. In this case, the fuel cell generates electric power according to the amount of consumed gas. The power generation amount is $\alpha \times C/\beta$ [kWh]. Therefore, in the case of the energy supply system 1 of this embodiment, hot water of calories C [kWh] and electric power $\alpha \times C/\beta$ [kWh] are obtained at cost of $A \times C/\beta$ [Yen].

Consider a case where, according to a conventional method, the hot water is generated in a gas hot water supply device and the electric power is purchased from a system. The cost of generation of hot water is $A \times C/\gamma$ [Yen]. The cost of purchase of electric power is $B \times \alpha \times C/\beta$ [Yen]. A total cost is $A \times C/\gamma + B \times \alpha \times C/\beta$ [Yen].

Assuming that the amount of generated hot water is equal and the electric power generated in the fuel cell is all consumed at home, the energy cost reduction amount in the case of using the energy supply system 1 is calculated according to the following formula (2).

$$\text{Energy Cost Reduction Amount} = ([\text{Conventional Cost}] - [\text{Cost of Energy Supply System 1}]) = (A \times C/\gamma + B \times \alpha \times C/\beta - A \times C/\beta) \qquad (2).$$

The above calculation method is merely exemplary and the energy cost reduction amount may be calculated using other method, as a matter of course.

The controller 6 may store, for example, time lapse changes (e.g., time transition in time periods and days of a week) of an electric power consumption amount and a hot water consumption amount at home in which the energy supply system 1 is actually installed, and predict time periods and days of the week when the electric power and the hot water are necessary, a necessary electric power amount and a necessary hot water amount, based on the time lapse changes. For example, based on time lapse changes in an electric power consumption amount and a hot water consumption amount for past 10 weeks (10 times as long as first specified period), an electric power consumption amount and a hot water consumption amount in each of time periods and each of days (each of second specified periods included in the first specified period) in the following week are predicted. Based on the predicted amounts, maximum operation time (second maximum operation time) in each of the days is determined by calculation such that, for example, a total of the second maximum operation times throughout the first specified period does not exceed the first maximum operation time and an energy cost reduction amount per unit time (e.g., per first specified period) is maximum.

The first maximum operation time and/or the second maximum operation time may be constant value(s). Alternatively, the controller 6 may change the first maximum operation time and/or the second maximum operation time according a predetermined condition. The predetermined condition may be at least one of calendar information, season information, an outside air temperature and a city water temperature.

An example of control based on the calendar information may be such that in a case where the consumed hot water amount is more in holidays than in weekdays, the second maximum operation time in weekdays is set shorter and the second maximum operation time in holidays is set longer.

An example of control based on the season information may be such that in a case where the consumed hot water amount is more in winter than in summer, the first maximum operation time in summer season (June-September) is set shorter, and the first maximum operation time in winter season (December-March) is set longer.

An example of control based on the outside air temperature or the city water temperature may be such that in a case where the consumed hot water amount is more when the outside air temperature or the city water temperature is lower than a predetermined threshold temperature, second maximum operation time in a day when the outside air temperature or the city water temperature is equal to or higher than the predetermined threshold temperature is set shorter, and second maximum operation time in a day when the outside air temperature or the city water temperature is lower than the predetermined threshold temperature is set longer.

The controller may change the first specified period according to a predetermined pattern. For example, the first specified period may be set shorter as an integrated use period is longer.

Figure 10:
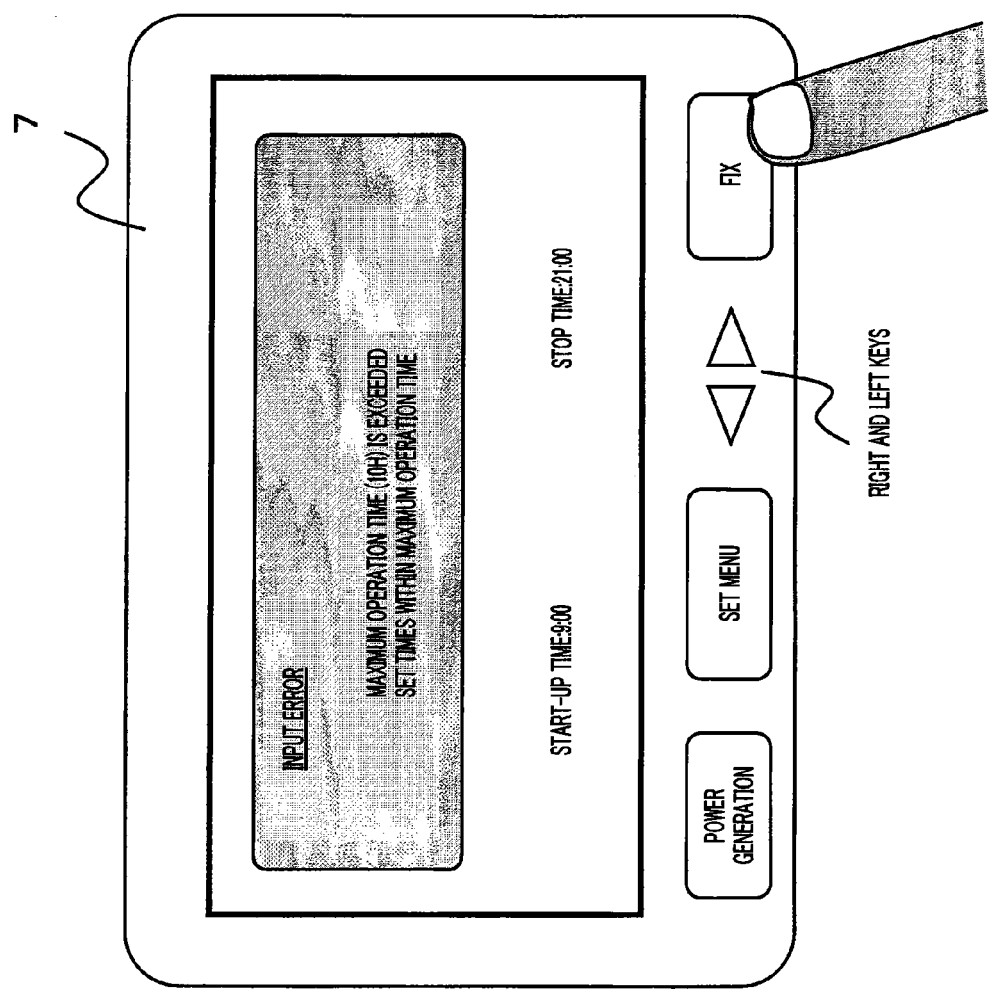
FIG. 10 is a view showing an example of operation clock time input abnormality which occurs when a remote controller in an energy supply system according to Modification Example 4 is operated.

As shown in FIG. 10, the energy supply system 1 may include a remote controller 7 used to input the start-up time and the stop time of the fuel cell unit 1a. In this case, the controller 6 may be configured to set the start-up time and the stop time which are input via the remote controller 7, as a device start-up time and a device stop time which are the start-up time and the stop time of the fuel cell unit 1a, respectively, if the time from the start-up time input via the remote controller 7 to the stop time input via the remote controller 7 does not exceed second maximum operation time, and not to set the start-up time and stop time which are input via the remote controller 7, as the device start-up time and the device stop time, if the time from the start-up time input via the remote controller 7 to the stop time input via the remote controller 7 exceeds the second maximum operation time.

The controller 6 may start-up the fuel cell unit 1a at the device start-up time and stop the fuel cell unit 1a at the device stop time.

The energy supply system 1 may include an informing device configured to inform that the planned operation time exceeds the second maximum operation time, if time (planned operation time) from the start-up time input via the remote controller 7 to the stop time input via the remote controller 7 exceeds the second maximum operation time. As shown in FIG. 10, the informing device may be integral with the remote controller 7 and may be configured to display information messages on a screen.

The controller 6 may update the first maximum operation time based on the integrated operation time of the fuel cell unit 1a. In this case, for example, the controller 6 may include a calendar circuit (not shown) for giving clock time and a memory (not shown). The controller 6 calculates actual operation time which is time for which the fuel cell unit 1a has been actually operated, based on a start-up time and a stop time which are obtained via the calendar circuit (e.g., real time counter as described later), adds the actual operation time to an integrated operation time stored in the memory, and stores the resulting sum in the memory again as an integrated operation time. In this manner, the integrated operation time can be obtained.

In cases where time from a start-time actually set to a stop time actually set is shorter than second maximum operation time, the operator forcibly terminates the operation, or electric power generated by power generation continues to be unconsumed at home for a long time and thereby efficiency is excessively decreased, the operation of the fuel cell unit 1a is sometimes stopped before the operation time of the fuel cell unit 1a reaches second maximum operation time in a second specified period. In this case, since the fuel cell unit 11a has been operated for a time shorter than a planned time, there will be a small chance that the operation time of the fuel cell unit 11a reaches the operation time life before the guaranteed operation period lapses if the fuel cell unit 1a is operated as necessary for a longer time by the surplus time in the future. Accordingly, if a surplus time can be saved for a future operation in a case where the actual operation time is shorter than a planned operation time, an advantage is achieved.

The controller 6 may calculate and integrate a difference between second maximum operation time and actual operation time of the fuel cell unit 1a within a second specified period, and store the resulting data as integrated surplus operation time, if the actual operation time of the fuel cell unit 1a within the second specified period is shorter than the second maximum operation time after the second specified period has elapsed.

The guaranteed operation period and the operation time life are not changed except for special cases. If the integrated surplus operation time increases, then the operation time of the fuel cell unit 1a is less likely to reach the operation time life before the guaranteed operation period lapses, even when the fuel cell unit 1a is operated for a time exceeding maximum operation time previously set. Accordingly, at the time point when the integrated surplus operation time is accumulated to a certain extent, it is preferred that the first maximum operation time be increased to improve flexibility of the operation of the energy supply system 1. To be specific, the controller 6 may be configured to update the first maximum operation time when the integrated surplus operation time reaches a preset third specified period (e.g., 100 hours). A time period from a time point when the first maximum operation time is updated to a time point when a guaranteed period at purchase ends is set as a new guaranteed operation period, and an integrated surplus operation time is set as the operation time life, which is assigned to the above formula (1), thereby newly obtaining first maximum operation time.

As will be described later in embodiments and modification examples, the controller 6 may be configured not to limit the operation time by the maximum operation time (set first maximum operation time and/or second maximum operation time) when a predetermined condition is met.

MODIFICATION EXAMPLES

Next, modification examples of the operation of the controller 6 of the fuel cell system 1 based on predicted heat load demand and predicted electric power load demand will be described with reference to the drawings.

Figure 2:
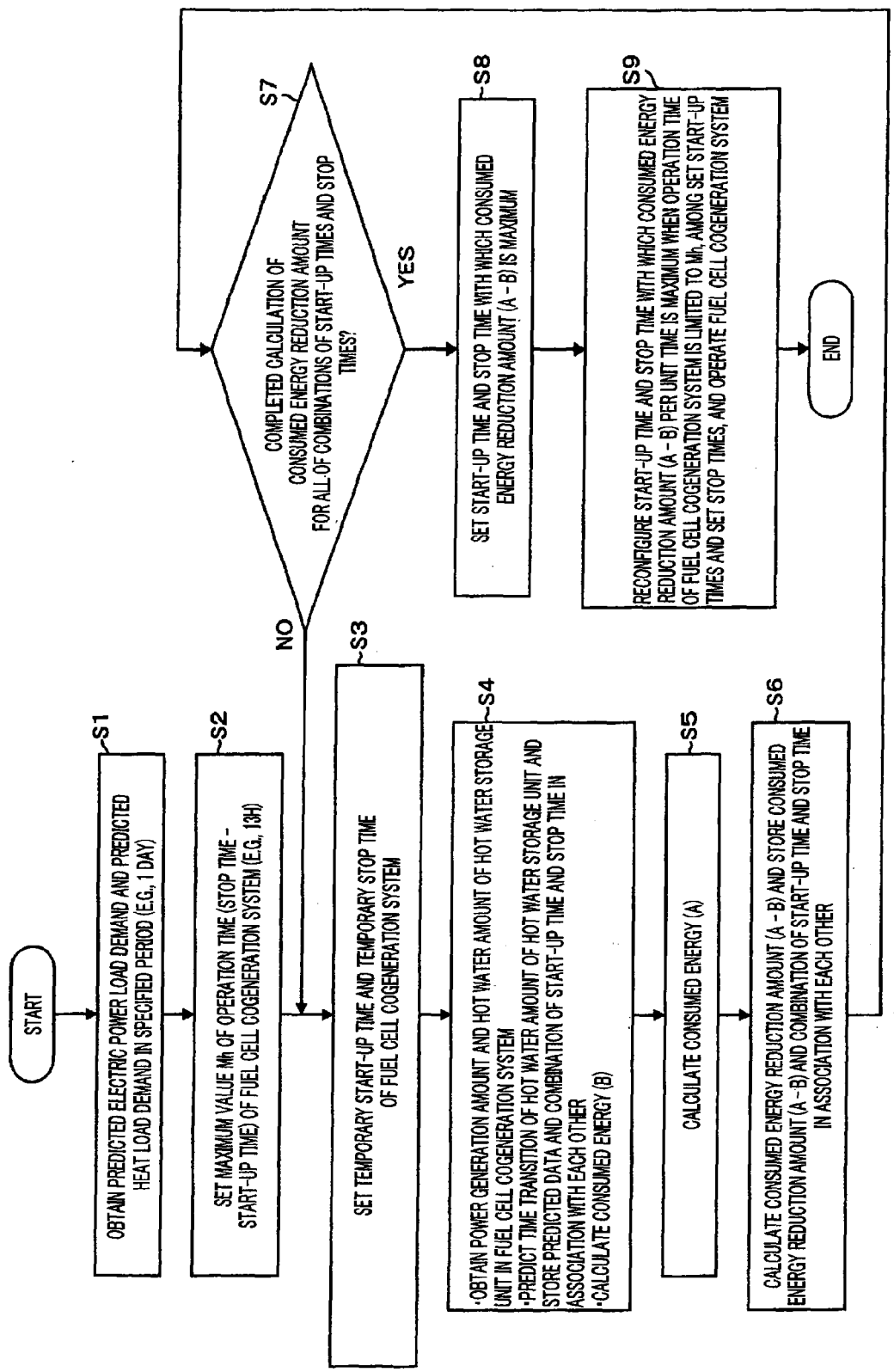
FIG. 2 is a flowchart showing an operation example of the energy supply system according to Embodiment 1.

FIG. 2 is a flowchart showing an operation example of the energy supply system according to this modification example.

Initially, the operation planning device 6c of the controller 6 obtains predicted electric power load demand and predicted heat load demand in a specified period (e.g., 1 day) which are stored in the memory 6a (step S1).

The predicted electric power load demand and the predicted heat load demand may be predicted demands based on typical electric power consumption history of electric power load and typical heat consumption history of heat load which are pre-stored in the memory 6a when the fuel cell system 1 installed at home is placed in a stationary state, or may be predicted demands based on electric power consumption history of electric power load and heat consumption history of heat load which are modified by the demand predictor 6b with a lapse of the operation of the fuel cell system 1, to be compatible with a life cycle of each home.

Next, the operation planning device 6c sets maximum operation time Mh of the fuel cell system 1 in a specified period (e.g., 1 day) (step S2), and then sets one of a number of combinations of start-up times and stop times of the fuel cell system 1, as a temporary start-up time and a temporary stop time (step S3). The maximum operation time Mh is a value set as an upper limit of the operation time in a specified period (e.g., 1 day) constituting a guaranteed operation period (e.g., 10 years) of the fuel cell system based on the guaranteed operation period such that the operation time of the system does not exceed operation time life (e.g., 40000 hours) before the guaranteed operation period lapses. In the fuel cell system of this modification example, the maximum operation time is set to a constant value throughout the guaranteed operation period, to be specific, 10 hours per day. When the guaranteed operation period is 10 years and the operation time life is 40000 hours, 40000 hours/(10 years×365 days)=10.96 hours, and therefore the maximum operation time per day is set to 10 hours as described above as a value with which the operation time does not reach the operation time life before the guaranteed operation period lapses.

Then, the operation planning device 6c calculates a total of a power generation amount generated by the fuel cell system 1 and a total of calories (hot water amount corresponding to the calories; hereinafter referred to as "hot water storage unit hot water supply amount)" supplied to the hot water storage unit 1b by the fuel cell system 1 during an operation period in a case where the energy supply system is assumed to be operated between the temporarily set start-up time and the temporality set stop time, based on the start-up time and the stop time of the fuel cell system 1 which are temporarily set in step S3, and the predicted electric power load demand and the predicted heat load demand in the specified period (e.g., 1 day) which are obtained from the memory 6a, and stores in the memory 6a, time transition of the hot water storage unit hot water supply amount predicted in this calculation. The operation planning device 6c predicts time transition of hot water amount (hereinafter referred to as "hot water storage unit hot water amount") of the hot water storage unit 1b which is stored in the fuel cell system 1 based on the predicted heat load demand and the time-transitional predicted data of the hot water storage unit hot water supply amount which are obtained from the memory 6a, on the premise that the hot water is supplied to the heat load to cover the predicted heat load demand so long as hot water is left in the hot water storage tank, and stores in the memory 6a, this predicted data and the combination of the start-up time and stop time which are temporarily set, in association with each other. Then, the operation planning device 6c calculates consumed energy (B) in the fuel cell system 1 which is required to generate the above total of the power generation amount and of the hot water storage unit hot water supply amount during the operation period (step S4).

The consumed energy (B) is a rough indication of consumed energy reduction at home when the fuel cell system 1 is introduced into home, and refers to a raw material energy (total energy of a material gas consumed by the operation of the fuel cell system 1, operational electric power of the fuel cell system 1, etc) which is required to operate the fuel cell system 1 when the above power generation amount and the above hot water storage unit hot water supply amount are generated.

Then, the operation planning device 6c calculates consumed energy (A) using the power generation amount and the hot water storage unit hot water supply amount in the fuel cell system 1 during the operation period (between start-up time and stop time) which is predicted and temporarily set by the operation planning device 6c in step S3 (step S5).

The consumed energy (A) is a reference of a consumed energy reduction amount at home when the fuel cell system 1 is introduced into home, and refers to total energy in a case where the whole of the power generation amount and hot water storage unit hot water supply amount in the fuel cell system 1 which are predicted by the operation planning device 6c are assumed to be covered by electric power and gas supplied by existing infrastructure of electric power company and gas company rather than the fuel cell system 1.

Then, the operation planning device 6c calculates a numeric value (A−B) by subtracting the consumed energy (B) in step S3 from the consumed energy (A) in step S5, and stores in the memory 6a, the numeric value (A−B) and the combination of start-up time and stop time which are temporarily set in step S3, in association with each other, on assumption that the numeric value (A−B) is the consumed energy reduction amount of the fuel cell system 1 (step S6).

The operation planning device 6c determines whether or not it has completed calculation of the consumed energy reduction amount (A−B) for all of the combinations of start-up times and stop times (step S7). If the operation planning device 6c determines that it has not completed calculation of the consumed energy reduction amount (A−B) for all of the combinations of start-up times and stop times ("No" in step S7), it repeats step S3, step S4, step S5 and step S6, whereas if the operation planning device 6c determines that it has completed calculation of the consumed energy reduction amount (A−B) for all combinations of start-up times and stop times ("Yes" in step S7), the process moves to a next step.

Further, the operation planning device 6c reads from the memory 6a, combination of start-up time and stop time with which the consumed energy reduction amount (A−B) is maximum, from among a plurality of combinations of start-up times and stop times which are stored in the memory 6a, in step S6, and, sets the read start-up time and stop time (step S8).

Then, the operation planning device 6c reconfigures a start-up time and a stop time with which the consumed energy reduction amount (A−B) per unit operation time is maximum when the operation time of the fuel cell cogeneration system is limited to Mh, from among the start-up times and stop times of the fuel cell system 1 which are set in step S8, and under this condition, the fuel cell system 1 is operated (step S9).

Then, the operation planning device 6c reconfigures a start-up time and a stop time with which the consumed energy reduction amount (A−B) per unit operation time is maximum when the operation time of the fuel cell cogeneration system is limited to Mh, from among the start-up times and stop times of the fuel cell system 1 which are set in step S8, and under this condition, the fuel cell system 1 is operated (step S9). The operation planning device 6c may be configured to integrate a time difference between maximum operation time and an operation time within a specified period to obtain an integrated surplus operation time when the operation time within the specified period is shorter than the maximum operation time and reconfigure the maximum operation time when the integrated operation time reaches a preset specified time, which also results in an advantage. A time difference between maximum operation time and operation time within a specified period in a case where the operation time within the specified period is shorter than the maximum operation time means that the operation time of fuel cell is not limited so strictly. This is because the fuel cell having limited total operation time can be operated efficiently by reconfiguring the maximum operation time by reflecting the integrated operation time when the integrated operation time of the time difference is longer.

Figure 3:
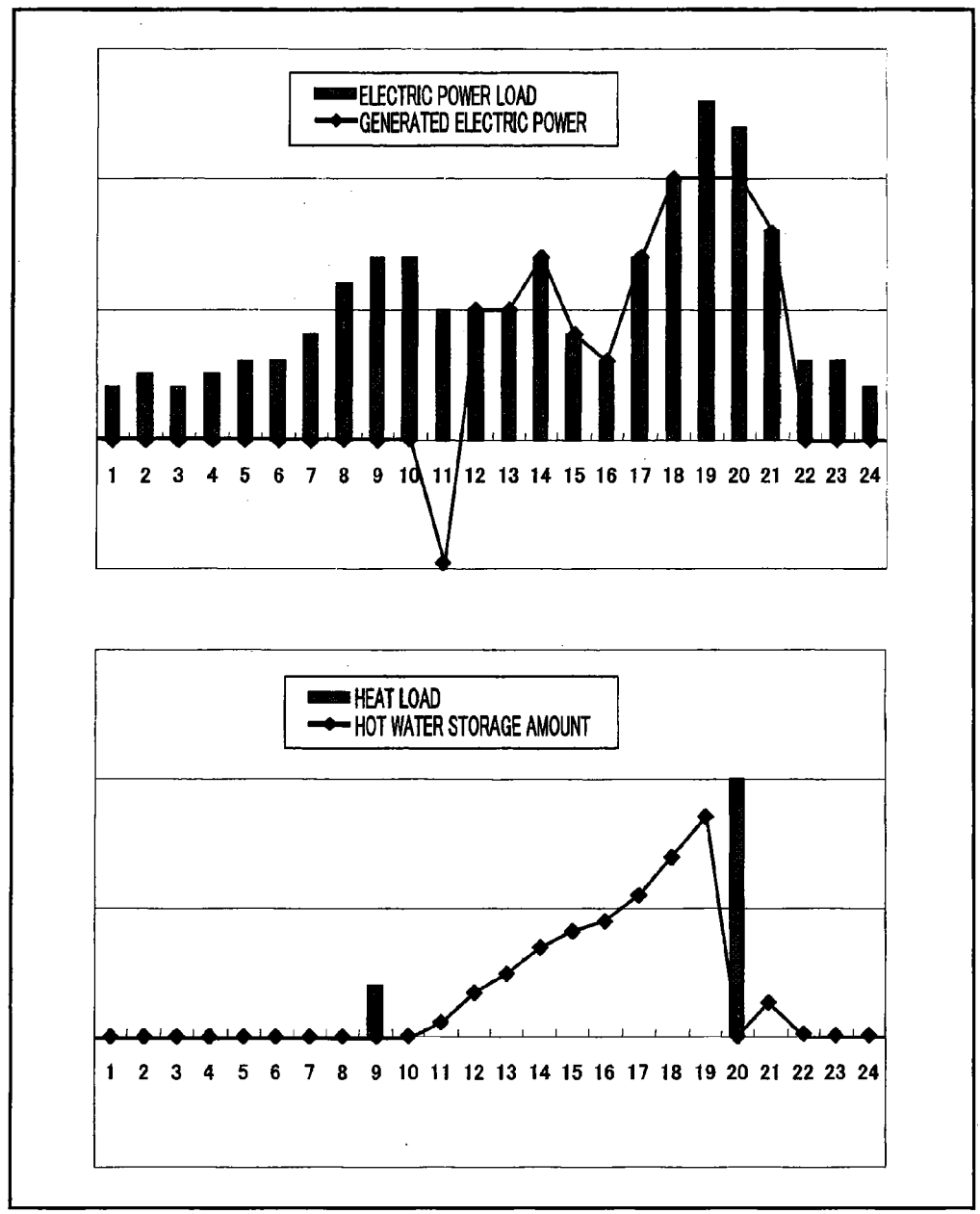
FIG. 3 is a view showing an example of operation history of the energy supply system according to Embodiment 1.

FIG. 3 shows an example of generated electric power history and hot water storage unit hot water amount history in a case where the fuel cell system of this modification example is operated, with respect to a certain electric power load and a certain heat load.

In FIG. 3, a horizontal axis indicates a clock time (1~24), a vertical axis in the upper drawing indicates electric power and a vertical axis in the lower drawing indicates a hot water amount.

The fuel cell system of this modification example requires 1 hour from start-up of the system until start of power generation of the system, and consumes equal start-up energy (e.g., 500 W) during a period from the start-up until the power generation.

In this example, the maximum operation time Mh of the fuel cell system 1 in the specified period (e.g., 1 day) in step S2 shown in the flowchart of FIG. 2 is set to 10 hours, and the start-up time and the stop time set in step S8 are 4:00 and 21:00, respectively, i.e., operation time is 17 hours.

To carry out the operation for 10 hours from 4:00 to 21:00, the start-up time is limited to a time between 4:00 and 11:00, and the stop time is likewise limited to a time between 14:00 and 21:00 in association with the start-time. In this example, the start-up time is reconfigured to 11:00 such that the consumed energy reduction amount (A−B) per unit operation time is maximum in step S9 in the flowchart of FIG. 2.

FIG. 3 shows predicted electric power load demand, predicted heat load demand in 1 day and the associated operation plan (power generation plan, hot water storage plan) of the fuel cell system, which is associated with the above result. As shown in FIG. 3, since the fuel cell system of this modification example starts-up at 11:00, only consumption of start-up energy occurs and the generated electric power is minus at 11:00.

As can be seen from FIG. 3, in the fuel cell system in this modification example, the fuel cell system stops at 21:00, and the time from start-up to stop is 10 hours.

With reference to the lower drawing of FIG. 3, the hot water amount of the hot water storage unit is zero at 20:00 because of a large hot water supply load generated at 20:00, and thus the fuel cell system is operated efficiently.

The generated electric power amount per unit operation time in the fuel cell system in this case, is about 570 Wh.

Figure 4:
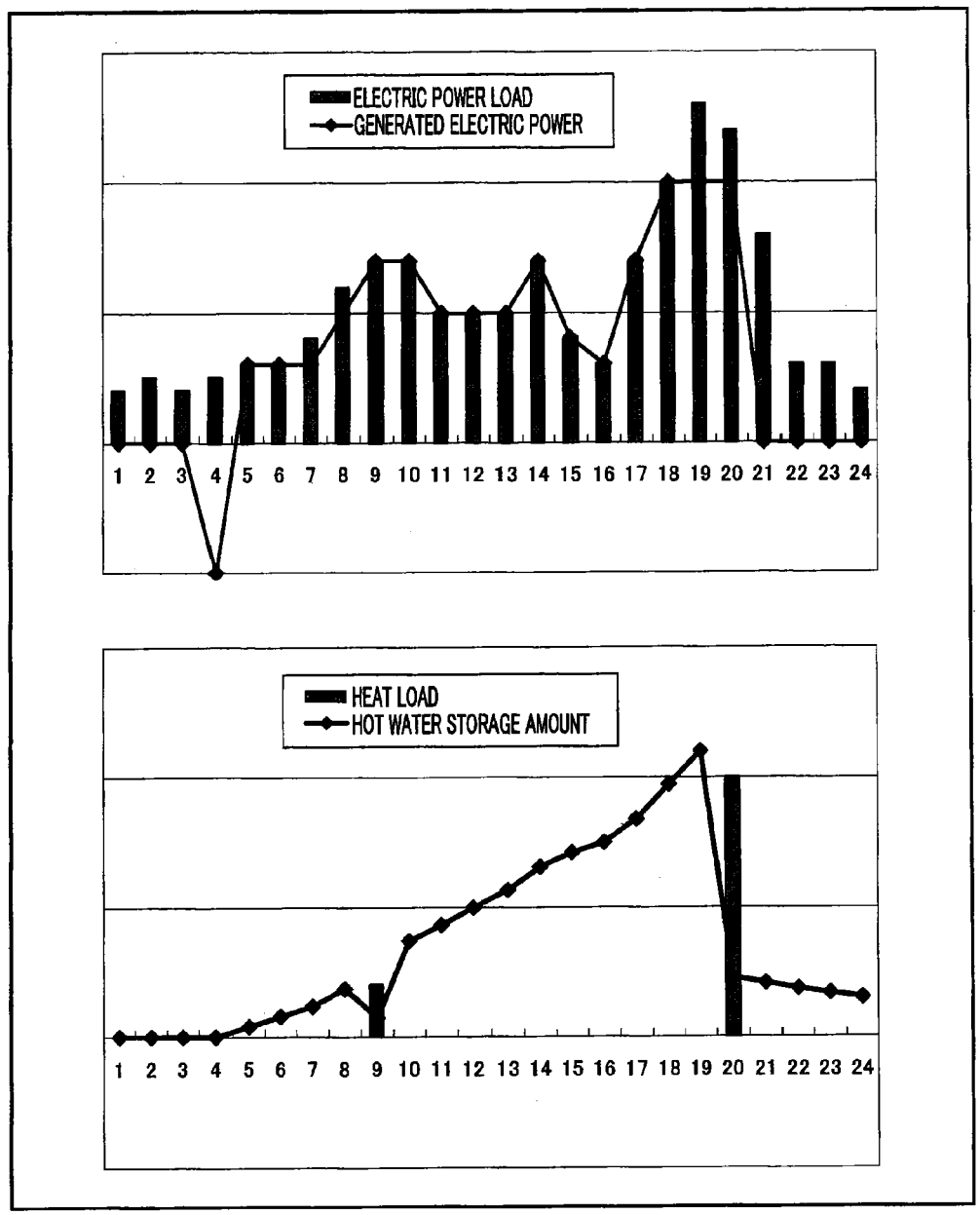
FIG. 4 is a view showing an example of operation history of an energy supply system using a conventional method.

As comparative example, FIG. 4 shows generated electric power history and hot water storage unit hot water amount history in a case where the fuel cell system is operated using a conventional method with respect to the same electric power load demand and heat load demand as those in FIG. 3.

In FIG. 4, a horizontal axis indicates clock time (1~24), a vertical axis in the upper drawing indicates electric power and a vertical axis in the lower drawing indicates a hot water amount.

Like the fuel cell system of this example, the fuel cell system using the conventional method requires 1 hour from start-up of the system until start of power generation of the system, and consumes equal start-up energy (e.g., 500 W) during a period from the start-up until the power generation.

The fuel cell system using the conventional method which is configured not to limit the operation time, starts-up at 4:00, and consumes start-up energy at 4:00, at which time, generated electric power is minus.

Thereafter, the fuel cell system using the conventional method carries power generation for 16 hours from 5:00 until 21:00, and as a result, hot water is left within the hot water storage unit at 21:00 when the system stops.

The generated electric power amount per unit operation time of the fuel cell system in this case is about 556 Wh.

As should be understood from the above, it is found out that in the fuel cell system of this modification example described in conjunction with FIG. 3, its operation time is shorter, but power generation amount per unit operation time is larger than in the fuel cell system using the conventional method described in conjunction with FIG. 4.

It is obvious that the consumed energy reduction amount per unit operation time increases as the generated electric power amount per unit operation time increases.

In accordance with the fuel cell system of modification example, the operation planning device 6d sets the maximum operation time of the system in the specified period such that at least the operation time life will not end before the guaranteed operation period lapses, the operation planning device 6c sets the start-up time and the stop time in the specified period under the condition in which the operation time is within the maximum operation time, and under this condition, the fuel cell system is operated. This makes it possible to suppress reduction of the consumed energy reduction amount per unit operation time which is associated with the use of the system, while lessening a possibility that the operation time of the system reaches the operation time life before the guaranteed operation period lapses.

Although the maximum operation time is 10 hours in this modification example, it is obvious that optimal maximum operation time is different, and a case where maximum operation time different from that of this modification example is set is within the scope of the present invention (merely one example of the present invention).

Although the cogeneration system using the fuel cell is described as an example of the energy supply system, it is obvious that similar advantages are achieved in a monogeneration system using only a power generation function of the fuel cell, in an engine energy supply system using an engine, or in a turbine-type power generation system for generating electric power by rotating a turbine with a gas.

Modification Example 1

In the fuel cell system of modification example 1, an example of the operation plan of the fuel cell system 1 in a case where the specified period in which the predicted electric power load demand and the predicted heat load demand are obtained is fixed as 1 day in step S1 of the flowchart of FIG. 2, has been described.

Alternatively, the period in which the predicted electric power load demand and the predicted heat load demand are obtained is not fixed but may be variable depending on, for example, season.

Figure 5:
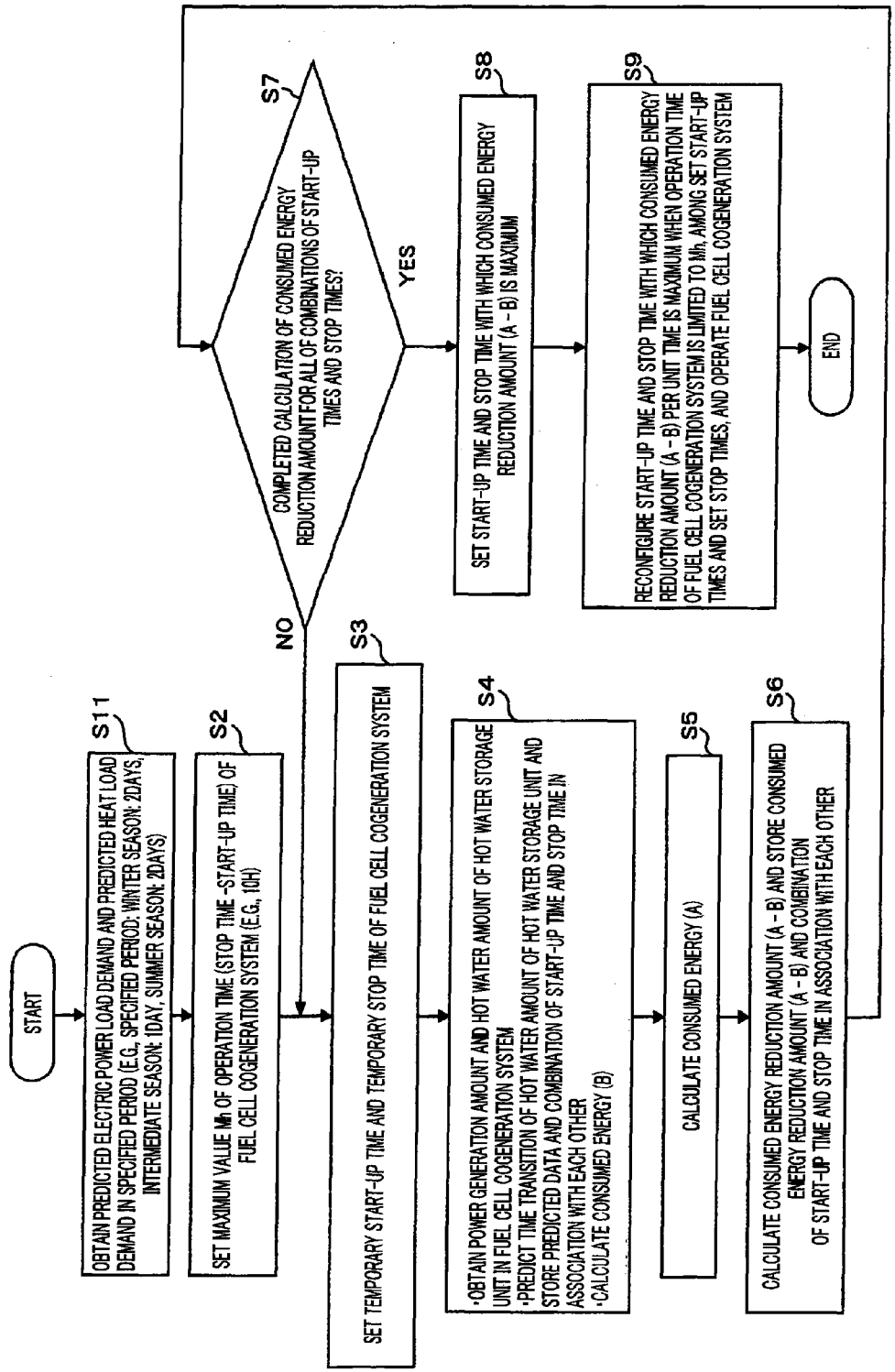
FIG. 5 is a flowchart showing an operation example of an energy supply system according to Modification Example 1 of Embodiment 1.

In a flowchart of FIG. 5, step S11 is performed instead of step S1 in the flowchart of FIG. 2.

The other steps in the flowchart of FIG. 5 are identical to those in the flowchart of FIG. 2 and will not be described repetitively.

In step S11, the period setting device 6e sets a specified period in an intermediate season (e.g., spring season from March to May and autumn season from September to November) to 1 day, the operation planning device 6d sets maximum operation time (e.g., 10 hours) for the 1 day, and then the operation planning device 6c obtains predicted electric power load demand and predicted heat load demand in specified 1 day, and sets a start-up time and a stop time in 1 day with which the operation time of the fuel cell system 1 is within the maximum operation time and the consumed energy reduction amount (A−B) is maximum.

In winter season (from December to February in the following year), heat load demand tends to be large, and therefore the operation time of the fuel cell system 1 typically tends to increase. In view of the consumed energy reduction amount (A−B), it could be desirable to operate the fuel cell system 1 throughout 1 day. In that case, for example, in winter season, the period setting device 6e sets a specified period to 2 days, the operation planning device 6d sets maximum operation time (e.g., 28 hours) for the 2 days, and then the operation planning device 6c obtains predicted electric power load demand and predicted heat load demand in specified 2 days, calculates an operation plan for the 2 days such that the operation time of the fuel cell system 1 is within the maximum operation time and the consumed energy reduction amount (A−B) is maximum, and sets a start-up time and a stop time of the fuel cell system 1.

In summer season (from June to August), heat load demand tends to be small, and therefore the operation time of the fuel cell system 1 typically tends to decrease. In view of the consumed energy reduction amount (A−B), in some cases, the fuel cell system 1 had better not start-up using start-up energy. In those case, for example, in summer season, the period setting device 6e sets a specified period to 2 days, the operation planning device 6d sets maximum operation time (e.g., 12 hours) for the 2 days, and then the operation planning device 6c obtains predicted electric power load demand and predicted heat load demand in specified 2 days, calculates an operation plan for the 2 days such that the operation time of the fuel cell system 1 is within the maximum operation time and the consumed energy reduction amount (A−B) is maximum, and sets a start-up time and a stop time of the fuel cell system 1.

The maximum operation time per day is set to decrease in the order of winter season, intermediate season and summer season.

In the manner as described above, the maximum operation time and the specified period are optimized so that the energy reduction amount is increased according to a variation in consumed energy of an object to which energy is supplied, which occurs with a change in season.

Modification Example 2

In the fuel cell system of Modification Example 1, the example of the operation plan has been described, in which the operation planning device 6d sets the maximum operation time Mh of the fuel cell system 1 to a constant value in step S2 of the flowchart shown in FIG. 2.

Alternatively, the maximum operation time Mh may be varied depending on, for example, season, instead of a constant value.

Figure 6:
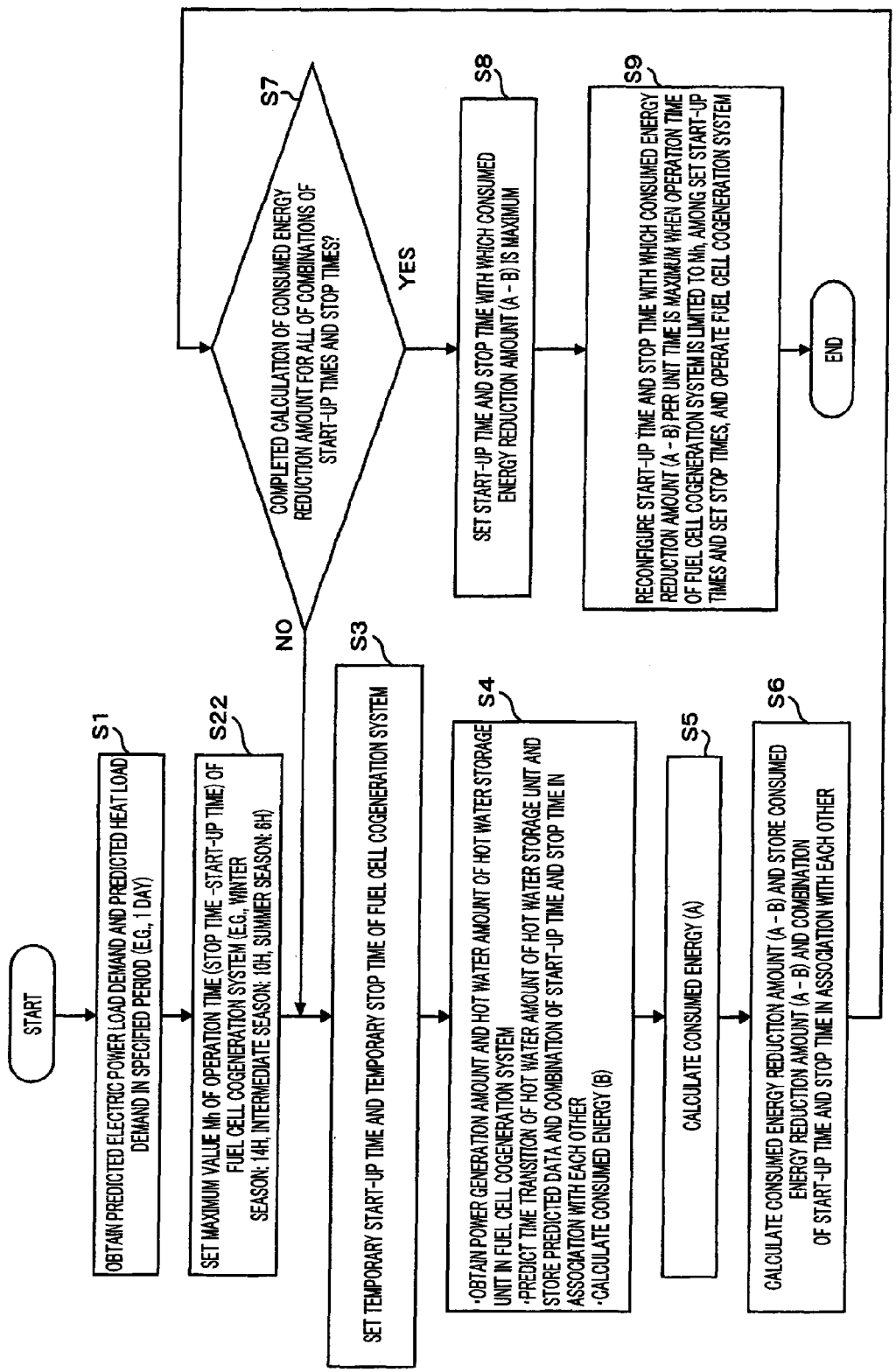
FIG. 6 is a flowchart showing an operation example of an energy supply system according to Modification Example 2 of Embodiment 1.

In a flowchart of FIG. 6, step S22 is performed instead of step S2 in the flowchart of FIG. 2.

The other steps in the flowchart of FIG. 6 are identical to those in the flowchart of FIG. 2 and will not be described repetitively.

Typically, heat load demand tends to be smaller in intermediate season (e.g., spring season from March to May and autumn season from September to November) than in winter season (from December to February in the following year), and tends to be smaller in summer season (from June to August) than in the intermediate season (e.g., spring season from March to May and autumn season from September to November), and therefore the consumed energy reduction amount (A−B) in the case where the fuel cell system is operated typically decreases in the order of winter season, intermediate season, and summer season.

Therefore, to obtain more yearly consumed energy reduction amount (A−B) in the fuel cell system 1, it is desirable that the operation time of the fuel cell system 1 be controlled to a relatively short time (maximum operation time Mh is set relatively short) in summer season, while the fuel cell system 1 be operated for a relatively long time (maximum operation time Mh is set relatively long) in winter season. In addition, to obtain more yearly consumed energy reduction amount (A−B), it is preferred that the maximum operation time Mh in a specified period be set to decrease in the order of winter season, intermediate season and summer season. It should be noted that in that case, the maximum operation time Mh is set such that the operation time does not reach the operation time life before the guaranteed operation period lapses as in the fuel cell system of Modification Example 1.

For example, when the guaranteed operation period is 10 years and the operation time life is 40000 hours, the operation planning device 6d of the fuel cell system 1 sets the maximum operation time Mh to 14 hours in winter season, sets the maximum operation time Mh of the fuel cell system 1 to 10 hours in the intermediate season, and sets the maximum operation time Mh of the fuel cell system 1 to 6 hours in the summer season, in step S22 of FIG. 6.

In the manner as described above, the maximum operation time is optimized so that the energy reduction amount is increased according to a variation in consumed energy of an object to which energy is supplied, which occurs with a change in season.

Modification Example 3

In the fuel cell system of Modification Example 1, the example of the operation plan has been described, in which the operation planning device 6d sets the maximum operation time Mh of the fuel cell system 1 to a constant value in step S9 of the flowchart shown in FIG. 2.

This modification example has a characteristic that the operation planning device 6d updates the maximum operation time Mh based on past operation time history, instead of setting the maximum operation time Mh to an always constant value.

In a fuel cell cogeneration system, in some cases, the operation planning device 6c plans the operation such that the operation time is not always equal to the maximum operation time, but sometimes plans the operation such that the operation time is less than the maximum operation time. In other cases, when the operation of the system starts actually, actual electric power load demand and actual heat load demand are less than predicted ones, and the fuel cell system stops before the stop time initially set by the operation planning device 6c. In other words, since a time before the end of the operation time life tends to increase with a lapse of time after installation of the system, under the condition in which the operation time is limited by the maximum operation time Mh initially set by the operation planning device 6d, the operation planning device 6d suitably updates and increases the maximum operation time Mh to minimize a remaining time of the operation time life at the end of the guaranteed operation period.

Figure 7:
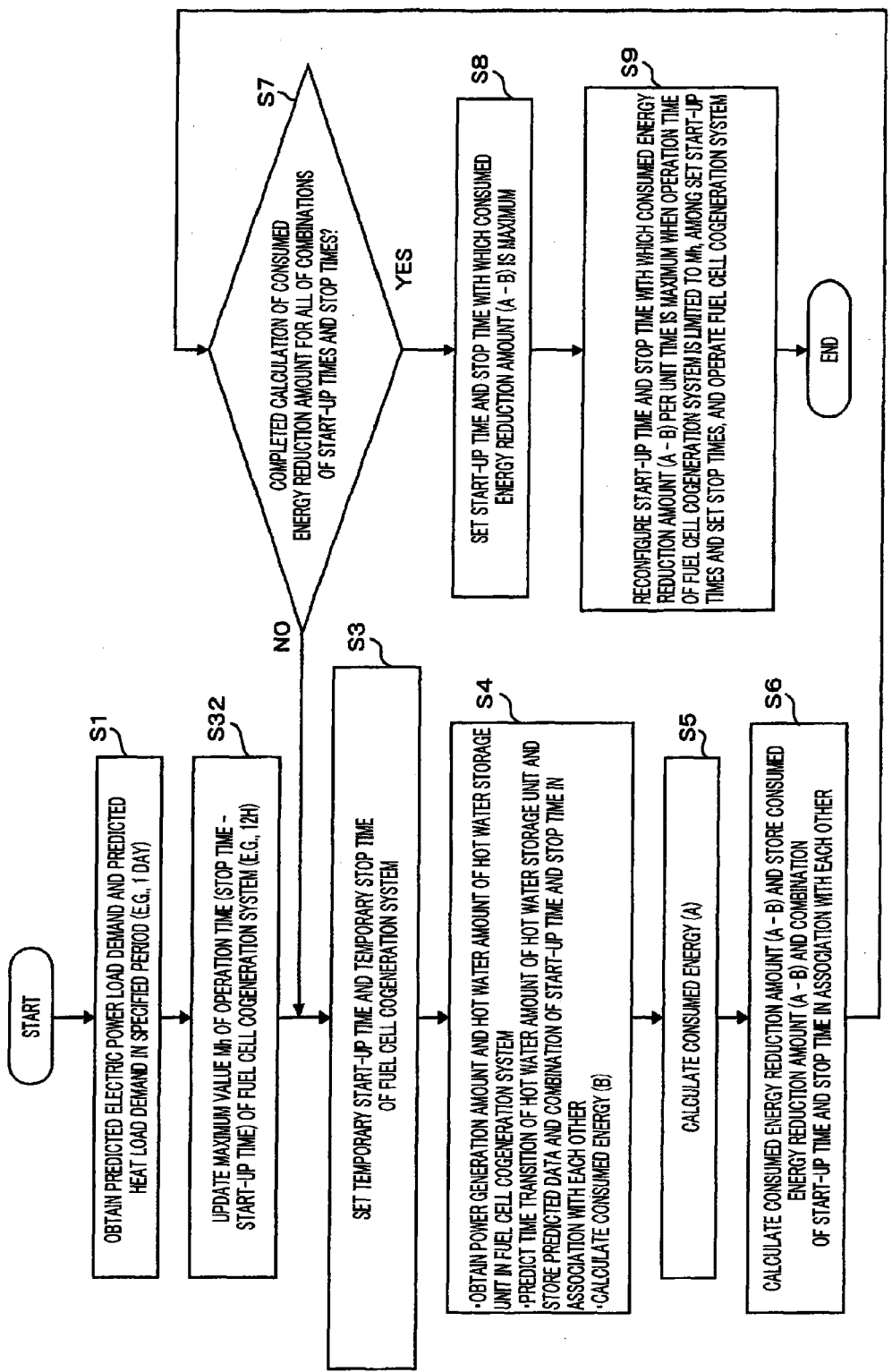
FIG. 7 is a flowchart showing an operation example of an energy supply system according to Modification Example 3 of Embodiment 1.

This is specifically shown in the flowchart of FIG. 7. Step S32 is performed instead of step S2 in the flowchart of FIG. 2.

The other steps in the flowchart of FIG. 7 are identical to those in the flowchart of FIG. 2 and will not be described repetitively.

In this modification example, in step S32, the operation planning device 6d updates the maximum operation time Mh based on past operation time history. To be specific, when it is determined that the operation time is not more than the operation time life within the guaranteed operation period even if the maximum operation time is increased from a current value by 1 hour, the operation planning device 6d increases the maximum operation time by 1 hour. Then, the operation planning device 6c reconfigures a start-up time and a stop time with which the consumed energy reduction amount (A−B) is maximum, based on the updated maximum operation time, and under this condition, the fuel cell system 1 is operated.

In this case, in view of the fact that the start-up time and the stop time with which the consumed energy reduction amount (A−B) is maximum, has already been set in step S8, the start-up time and the stop time are simply reconfigured in such a manner that the start-up time and the stop time with which the consumed energy B is minimum are reconfigured. Also in this case, advantages similar to those in other modification examples are achieved.

Embodiment 2

Figure 8:
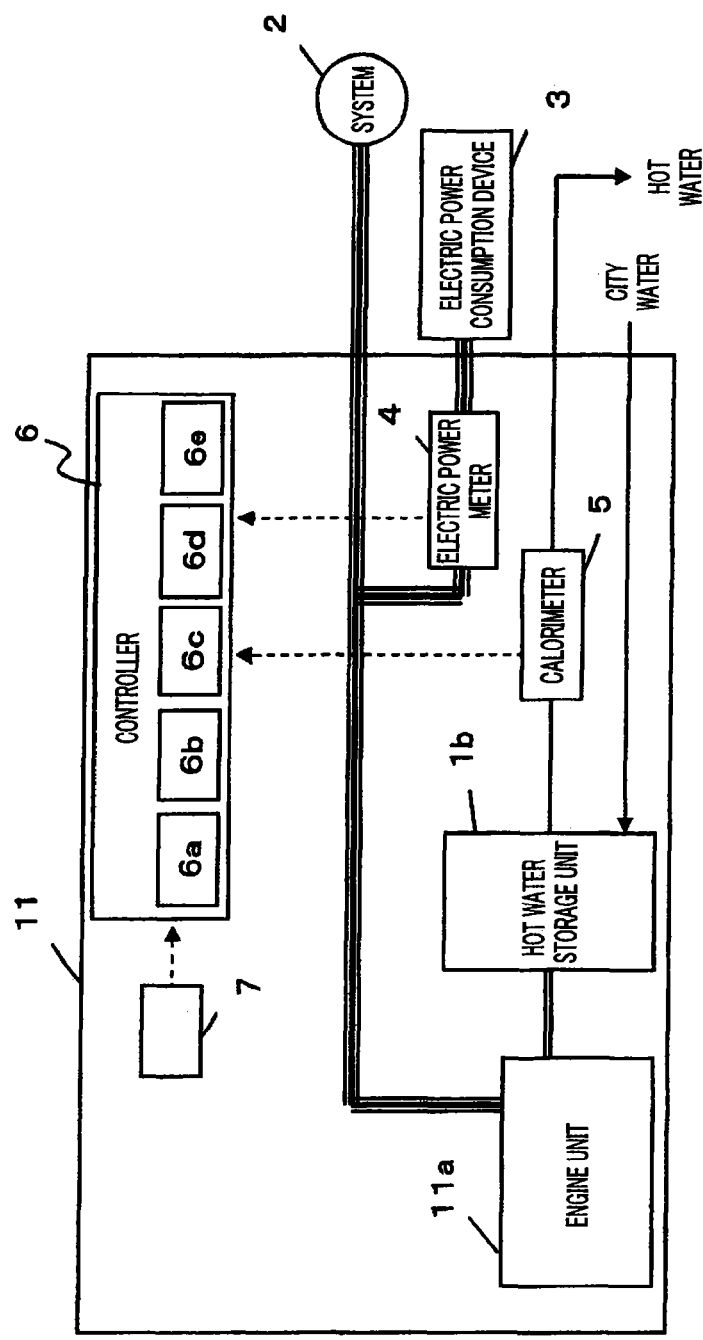
FIG. 8 is a block diagram showing a configuration example of an energy supply system according to Embodiment 2.

FIG. 8 is a block diagram showing a configuration example of an energy supply system according to Embodiment 2 of the present invention. As an example of the energy supply system, an engine energy supply system is shown.

An engine energy supply system 11 according to this embodiment of FIG. 8 includes an engine unit 11a instead of the fuel cell unit 1a in the fuel cell system 1 according to Embodiment 1 shown in FIG. 1, and a remote controller 7 via which the user can set as desired a start-up time and a stop time of the engine cogeneration system 11. The other constituents are identical to those of FIG. 1, and are designated by the same reference numerals as those in FIG. 1.

The energy supply system 11 of this embodiment includes the unit 11a for generating electric power using an engine, and the hot water storage unit 1b which converts city water to hot water by increasing its temperature using heat generated by power generation of the engine of the engine unit 11a, and stores the hot water. The energy supply system 11 supplies electric power generated in the engine unit 11a to the electric power consumption device 3 together with electric power from the electric power system 2.

An electric power load amount consumed by the electric power consumption device 3 is measured by the electric power meter 4 and sequentially stored in the memory 6a in the controller 6.

The hot water stored in the hot water storage unit 1b is supplied as the hot water via a faucet or the like. The heat load amount used as the hot water is measured by the calorimeter 5 and sequentially stored in the memory 6a in the controller 6.

The calorimeter 5 includes, for example, a temperature sensor (not shown) for measuring the city water temperature, a temperature sensor (not shown) for measuring the temperature of the hot water supplied from the hot water storage unit 1b, and a flow meter (not shown) for measuring the flow rate of the hot water supplied from the hot water storage unit 1b. The calorimeter 5 is configured to calculate a heat load amount used as the hot water, from a product of a temperature difference between the city water and the hot water, and the flow rate of the hot water.

The engine energy supply system 11 includes a backup hot water supply device (not shown) to supply the hot water when the hot water in the hot water storage unit 1b has run out.

The remote controller 7 is operated by a user to set a start-up time and a stop time of the engine energy supply system 11, and the set start-up time and the set stop time are stored in the memory 6a.

The controller 6 further includes a demand predictor 6b for predicting time-series patterns of future electric power load and future heat load from histories of electric power load and heat load which are stored in the memory 6a, and an operation planning device 6c for determining a start-time and a stop time of the engine energy supply system 1 based on predicted values of the time series patterns of electric power load and heat load which are predicted by the demand predictor 6b, between the start-up time and the stop time set by the remote controller 7.

The demand predictor 6b reads heat load demand history and electric power load demand history in a specified period (e.g., 1 year) which are stored in the memory 6a, estimates and calculates predicted demand of electric power load which changes with a lapse of time in a future specified period (e.g., 1 day) and predicted demand of heat load which changes with a lapse of time in the future specified period (e.g., 1 day) (hereinafter these are referred to as "predicted electric power load demand" and "predicted heat load demand"), based on the read histories, and stores the predicted electric power load demand and the predicted heat load demand sequentially in the memory 6a.

The storage period of past electric power load for estimating the predicted electric power load demand and the storage period of heat consumption history of heat load necessary for estimating the predicted heat load demand are desirably periods in which the system can properly grasp consumption cycles of electric power and heat in an object for which the engine energy supply system 1 of this embodiment is installed. For example, in a case where the engine energy supply system 1 is installed at home, the storage period is about several days to several months.

Figure 9:
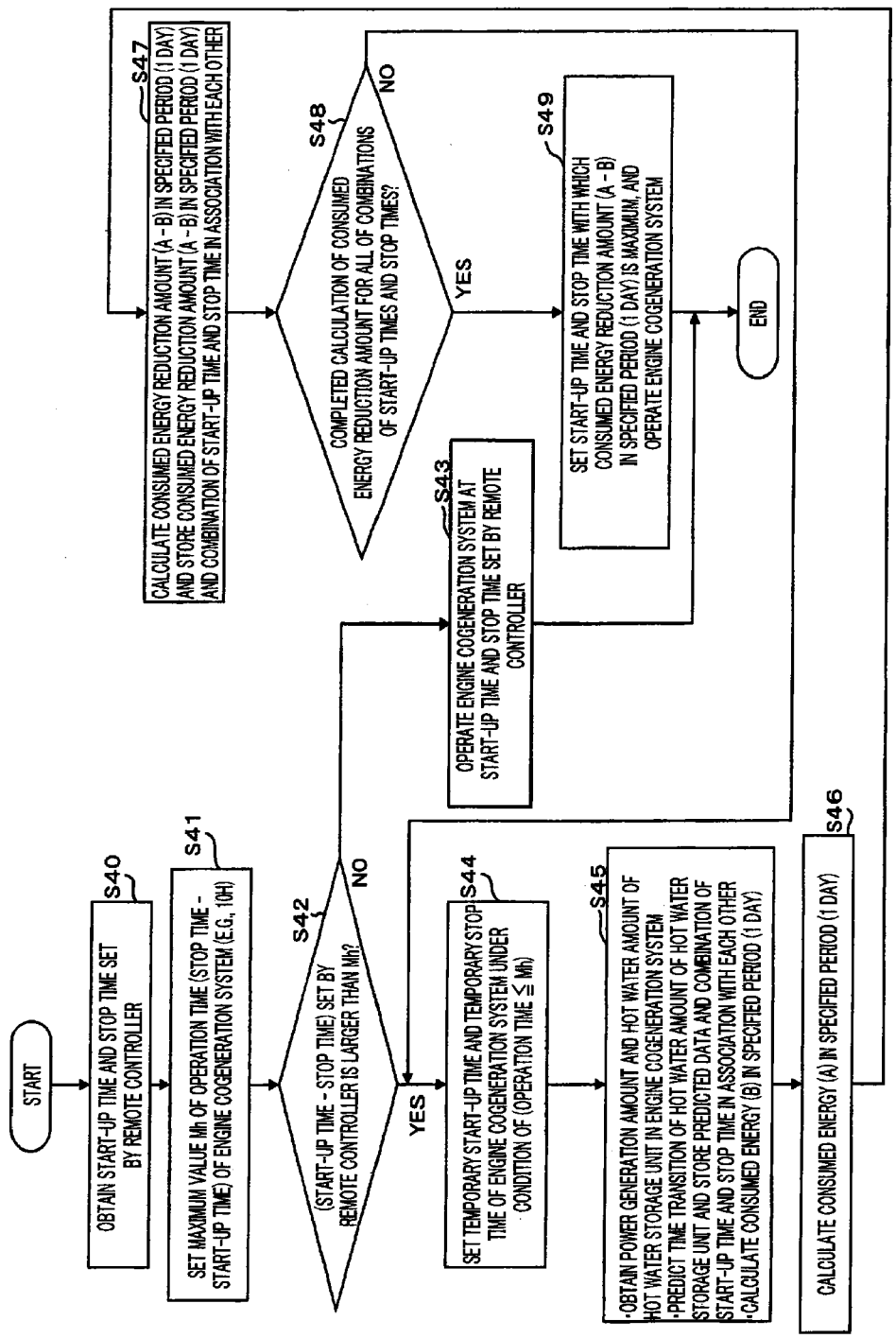
FIG. 9 is a flowchart showing an operation example of the energy supply system according to Embodiment 2.

FIG. 9 is a flowchart showing an operation example of the energy supply system according to Embodiment 2.

Initially, the operation planning device 6c of the controller 6 obtains the start-up time and the stop time which are set by the remote controller 7, from the memory 6a (step S40).

Then, the operation planning device 6d sets maximum operation time Mh (e.g., 10 hours) of the engine energy supply system 11 in a specified period (e.g., 1 day) such that the operation time of the system 11 does not reach operation time life (e.g., 40000 hours) before a guaranteed operation period (e.g., 10 years) lapses (step S41), and then the operation planning device 6c compares the operation time from the start-up time obtained in step S40 to the stop time obtained in step S40 to the maximum operation time Mh (step S42).

If the time from the start-up time to the stop time is equal to or shorter than the maximum operation time, the engine energy supply system is operated at the start-up time and the stop time set by the remote controller 7 (step S43).

On the other hand, if the time from the start-up time to the stop time is longer than the maximum operation time, the operation planning device 6c sets as a temporary start-up time and a temporary stop time, one of a plurality of combinations of start-up times and stop times with which the operation time is equal to or shorter than the maximum operation time Mh, in a period between the start-up time set by the remote controller 7 and the stop time set by the remote controller 7 (step S44). Then, the operation planning device 6c calculates a total of power generation amount generated by the engine energy supply system 11 and a total of calories (hot water amount corresponding to the calories: hereinafter referred to as "hot water storage unit hot water supply amount") supplied to the hot water storage unit 1b by the engine energy supply system 11 during the operation period in a case where the energy supply system is assumed to be operated in the period between the temporarily set start-up time and the temporarily set stop time, based on the start-up time and the stop time of the engine energy supply system 11 which are temporarily set in step S44, and the predicted electric power load demand and the predicted heat load demand in the specified period (e.g., 1 day) which are obtained from the memory 6a, and stores in the memory 6a, time transition of the hot water storage unit hot water supply amount predicted in calculation. Then, the operation planning device 6c predicts time transition of hot water amount (hereinafter referred to as "hot water storage unit hot water amount") of the hot water storage unit 1b which is stored in the engine energy supply system 11 based on the predicted heat load demand and the time-transitional predicted data of the hot water storage unit hot water supply amount which are obtained from the memory 6a, on the premise that the hot water is supplied to the heat load to cover the predicted heat load demand so long as hot water is left in the hot water storage tank, and stores in the memory 6a, the predicted data and the combination of the start-up time and stop time which are temporarily set, in association with each other. Then, the operation planning device 6c calculates consumed energy (B) of the engine energy supply system 11 in a specified period (e.g., 1 day) which is required to generate the above total of the power generation amount and of the hot water storage unit hot water supply amount during the operation period (step S45).

The consumed energy (B) in the specified period (e.g., 1 day) is a rough indication of consumed energy reduction at home when the engine energy supply system 11 is introduced into home, and refers to a raw material energy (total energy of a material gas consumed by the operation of the engine energy supply system 11, operational electric power of the engine energy supply system 11, etc) which is required to operate the engine energy supply system 11 when the above power generation amount and the above hot water storage unit hot water supply amount are generated.

Then, the operation planning device 6c calculates consumed energy (A) in a specified period (e.g., 1 day) using the power generation amount and the hot water storage unit hot water supply amount in the engine energy supply system 11 during the operation period (between start-up time and stop time) which is predicted and temporarily set by the operation planning device 6c in step S44 (step S46).

The consumed energy (A) in the specified period (e.g., 1 day) is a reference of a consumed energy reduction amount at home when the engine energy supply system 11 is introduced into home, and refers to total energy in a case where the whole of the power generation amount and hot water storage unit hot water supply amount in the engine energy supply system 11 which are predicted by the operation planning device 6c are assumed to be covered by electric power and gas supplied by existing infrastructure of electric power company and gas company rather than the engine energy supply system 11.

Then, the operation planning device 6c calculates a numeric value (A−B) by subtracting the consumed energy (B) in the specified period (e.g., 1 day) in step S44 from the consumed energy (A) in the specified period (e.g., 1 day) in step S46, and stores in the memory 6a, the numeric value (A−B) and the combination of start-up time and stop time which are temporarily set in step S44, in association with each other, on assumption that the numeric value (A−B) is the consumed energy reduction amount in the specified period (e.g., 1 day) in the engine energy supply system 11 (step S47).

The operation planning device 6c determines whether or not it has completed calculation of the consumed energy reduction amount (A−B) in the specified period (e.g., 1 day) for all of the combinations of start-up times and stop times (step S48). If the operation planning device 6c determines that it has not completed calculation of the consumed energy reduction amount (A−B) in the specified period (e.g., 1 day) for all of the combinations of start-up times and stop times ("No" in step S48), it repeats step S44, step S45, step S46 and step S47, whereas if the operation planning device 6c determines that it has completed calculation of the consumed energy reduction amount (A−B) in the specified period (e.g., 1 day) for all of the combinations of start-up times and stop times ("Yes" in step S48), the process moves to a next step.

Further, the operation planning device 6c reads from the memory 6a, the combination of start-up time and stop time, with which the consumed energy reduction amount (A−B) in the specified period (e.g., 1 day) is maximum, from among a plurality of combinations of start-up times and stop times which are stored in the memory 6a, in step S47, sets the read start-up time and stop time, and under this condition, the engine energy supply system 11 is operated (step S49).

In accordance with the engine energy supply system of Embodiment 2 as described above, if the operation time of the system exceeds the predetermined maximum operation time (e.g., 10 hours in the example of Embodiment 2) even in a case where the user sets the start-up time and the stop time of the system, the operation planning device 6c reconfigures the combination of the start-up time and the stop time within the period from the start-up time set by the user to the stop time set by the user, with which the operation time is equal to or shorter than the maximum operation time and with which the consumed energy reduction amount in the specified period (e.g., 1 day) is maximum. Thus, suppressing of the operation time and reduction of the consumed energy amount are fulfilled together while meeting the user's start-up and stop demand.

Although the maximum operation time is 10 hours and the specified period for which the consumed energy reduction amount is calculated is 1 day in this embodiment, it is obvious that the optimal maximum operation time and the period for which the consumed energy reduction amount is calculated are sometimes different depending on the electric power load and heat load in an object for which the engine energy supply system is installed, and a case where maximum operation time and a period for which the consumed energy reduction amount is calculated are set differently from those of this embodiment is within the scope of the present invention (merely one example of the present invention).

Although the engine energy supply system is described as an example of the energy supply system, it is obvious that similar advantages are achieved in a fuel cell system using a fuel cell or a turbine-type power generation system for generating electric power by rotating a turbine.

Modification Example 4

The above energy supply system of Embodiment 2 is configured such that if the operation time from the start-time input via the remote controller 7 and the stop time input via the remote controller 7 exceeds the maximum operation time Mh, the combination of the start-up time and the stop time within the period from the start-up time set by the user to the stop time set by the user, with which the operation time is equal to or shorter than the maximum operation time Mh and with which the consumed energy reduction amount in the specified period (e.g., 1 day) is maximum, is reconfigured.

Unlike Embodiment 2, an energy supply system of this modification example has a characteristic that if the operation time from the start-time input via the remote controller 7 and the stop time input via the remote controller 7 exceeds the maximum operation time Mh (e.g., 10 hours), these clock times are not fixed as operation clock times, but instead an error message is displayed to inform the user that maximum operation time Mh is exceeded.

In this modification example, the remote controller 7 shown in FIG. 10 is operated to input operation clock times (start-up time, stop time) of the energy supply system. To be specific, a set menu button of the remote controller 7 is operated to select an input menu of operation clock times. After that, right and left keys are operated to input the respective clock times and then the operation clock times are fixed by a fix button.

In this case, if the operation time from the input start-up time to the input stop time exceeds the maximum operation time Mh, the error message is displayed as shown in FIG. 10. The error message includes a message stating that the maximum operation time Mh is exceeded and a message for prompting the user to input the operation clock times such that the operation time falls within the maximum operation time Mh. The information of errors displayed on the remote controller 7 is not limited to that in this modification example, but may be only an error code.

Embodiment 3

An energy supply system according to Embodiment 3 of the present invention is configured to include the constituents of the engine energy supply system 11 shown in FIG. 8, similarly to Embodiment 2. The constituents for performing the same operations as those of Embodiment 2 will not be described repetitively.

The remote controller 7 of this embodiment is operated by the user to set an operation mode (hot water storage mode) in which the engine energy supply system 11 is started-up and stopped based on the hot water amount in the hot water storage unit 1b.

The operation of the engine energy supply system 11 in setting the hot water storage mode will be described hereinafter.

In a case where the hot water storage mode is set by the remote controller 7, a maximum hot water storage amount and a minimum hot water storage amount can be set by the remote controller 7.

For example, in a case where the hot water storage unit is divided into four equal parts in a vertical direction and the hot water storage amount can be set as full, ¾, ½, ¼, and 0 from above, the system starts-up at a time point when the hot water storage amount is reduced to ½ and stops at a time point when the hot water storage amount reaches full, if a start-up hot water storage amount is set to 1.2 by the remote controller 7 and a stop hot water storage amount is set to full by the remote controller 7.

Figure 11:
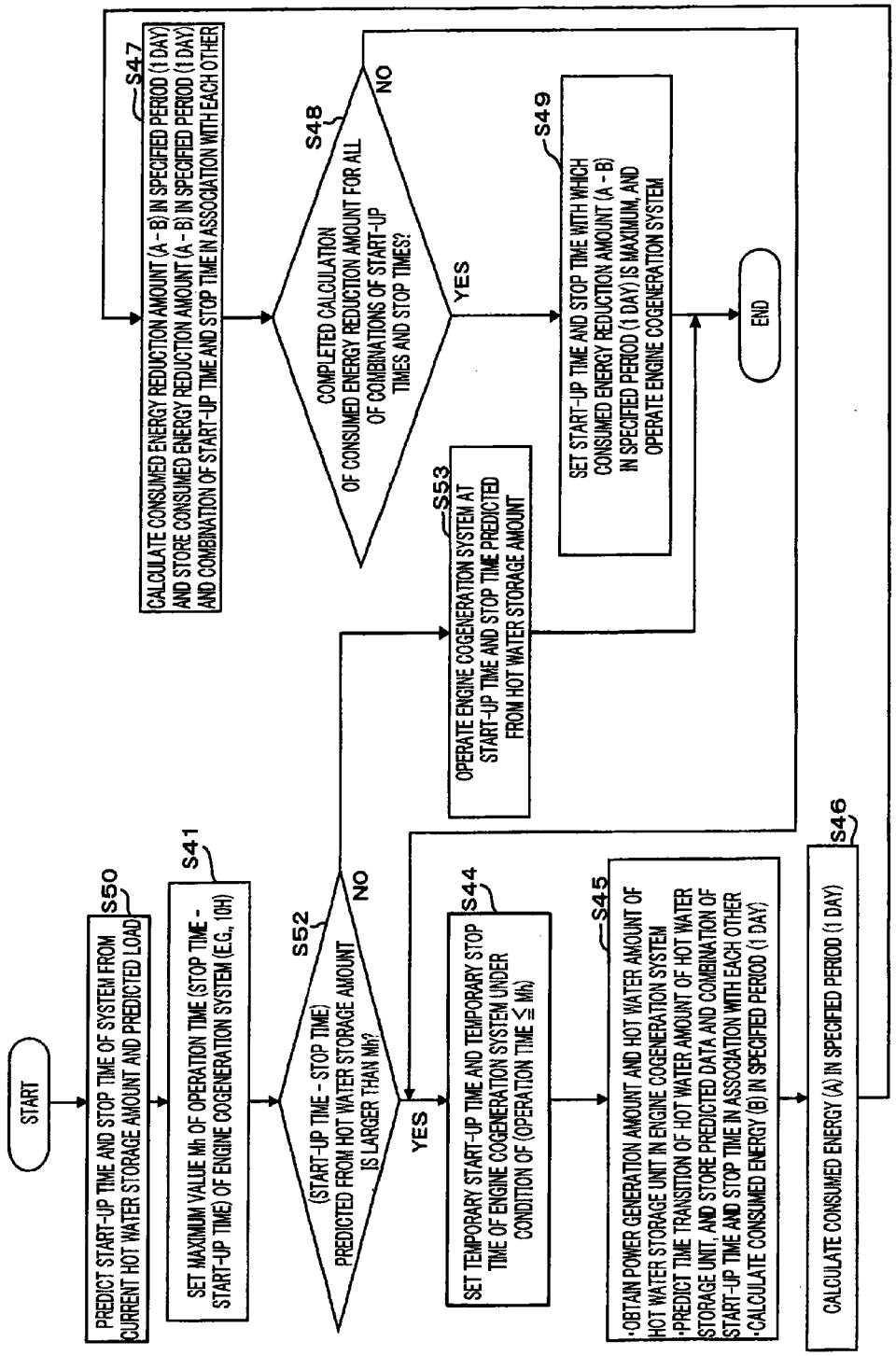
FIG. 11 is a flowchart showing an operation example of an energy supply system according to of Embodiment 3.

FIG. 11 is a flowchart showing an operation example of the energy supply system according to of Embodiment 3.

The constituents for performing the same operations as those in FIG. 9 in Embodiment 2 are designated by the same reference numerals.

Initially, the operation planning device 6c of the controller 6 predicts a start-up time and a stop time of the engine energy supply system 11 from a start-up hot water storage amount set by the remote controller 7, a stop hot water storage amount set by the remote controller 7, predicted electric power load demand and predicted heat load demand which are stored in the memory 6a.

Then, the operation planning device 6d sets maximum operation time Mh (e.g., 10 hours) of the engine energy supply system 11 in a specified period (e.g., 1 day) such that the operation time of the system 11 does not reach operation time life (e.g., 40000 hours) before a guaranteed operation period (e.g., 10 years) lapses (step S41), and then the operation planning device 6c compares the time from the start-up time predicted in step S50 to the stop time predicted in step S50 to the maximum operation time Mh (step S52).

If the time from the start-up time to the stop time is equal to or shorter than the maximum operation time, the engine energy supply system is operated at the start-up time and the stop time which are predicted from the hot water storage amount (step S53).

On the other hand, if the time from the start-up time to the stop time is longer than the maximum operation time, the operation planning device 6c sets as a temporary start-up time and a temporary stop time, one of a plurality of combinations of start-up times and stop times within the period from the start-up time initially predicted to the stop time initially predicted in the hot water storage mode, with which the operation time is equal to or shorter than the maximum operation time Mh (step S44). The operation in the following step S45 to step S49 is identical to that of Embodiment 2 and will not be described repetitively.

In accordance with the engine energy supply system of Embodiment 3 as described above, if the operation time of the system exceeds the predetermined maximum operation time (e.g., 10 hours in the example of Embodiment 3) even in a case where the user sets the start-up and the stop of the system in association with the hot water storage amount, the combination of the start-up time and the stop time within the period from the start-up time initially predicted to the stop time initially predicted in the hot water storage mode, with which the operation time is equal to or shorter than the maximum operation time and with which the consumed energy reduction amount in the specified period (e.g., 1 day) is maximum, is reconfigured. Thus, suppressing of the operation time and reduction of the consumed energy amount are fulfilled together while meeting the user's start-up and stop demand.

Although the maximum operation time is 10 hours and the specified period for which the consumed energy reduction amount is calculated is 1 day in this embodiment, it is obvious that the optimal maximum operation time and the period for which the consumed energy reduction amount is calculated are sometimes different depending on the electric power load and heat load in an object for which the engine energy supply system is installed, and a case where maximum operation time and a period for which the consumed energy reduction amount is calculated are set differently from those of this embodiment is within the scope of the present invention (merely one example of the present invention).

Although the engine energy supply system is described as an example of the energy supply system, it is obvious that similar advantages are achieved in a fuel cell system using a fuel cell or in a turbine-type power generation system for generating electric power by rotating a turbine.

Embodiment 4

A cogeneration (heat and electric power supply) system according to Embodiment 4 of the present invention is configured to include the constituents of the fuel cell system 1 shown in FIG. 1, similarly to Embodiment 1. The constituents for performing the same operations as those of Embodiment 1 will not be described repetitively.

Figure 12:
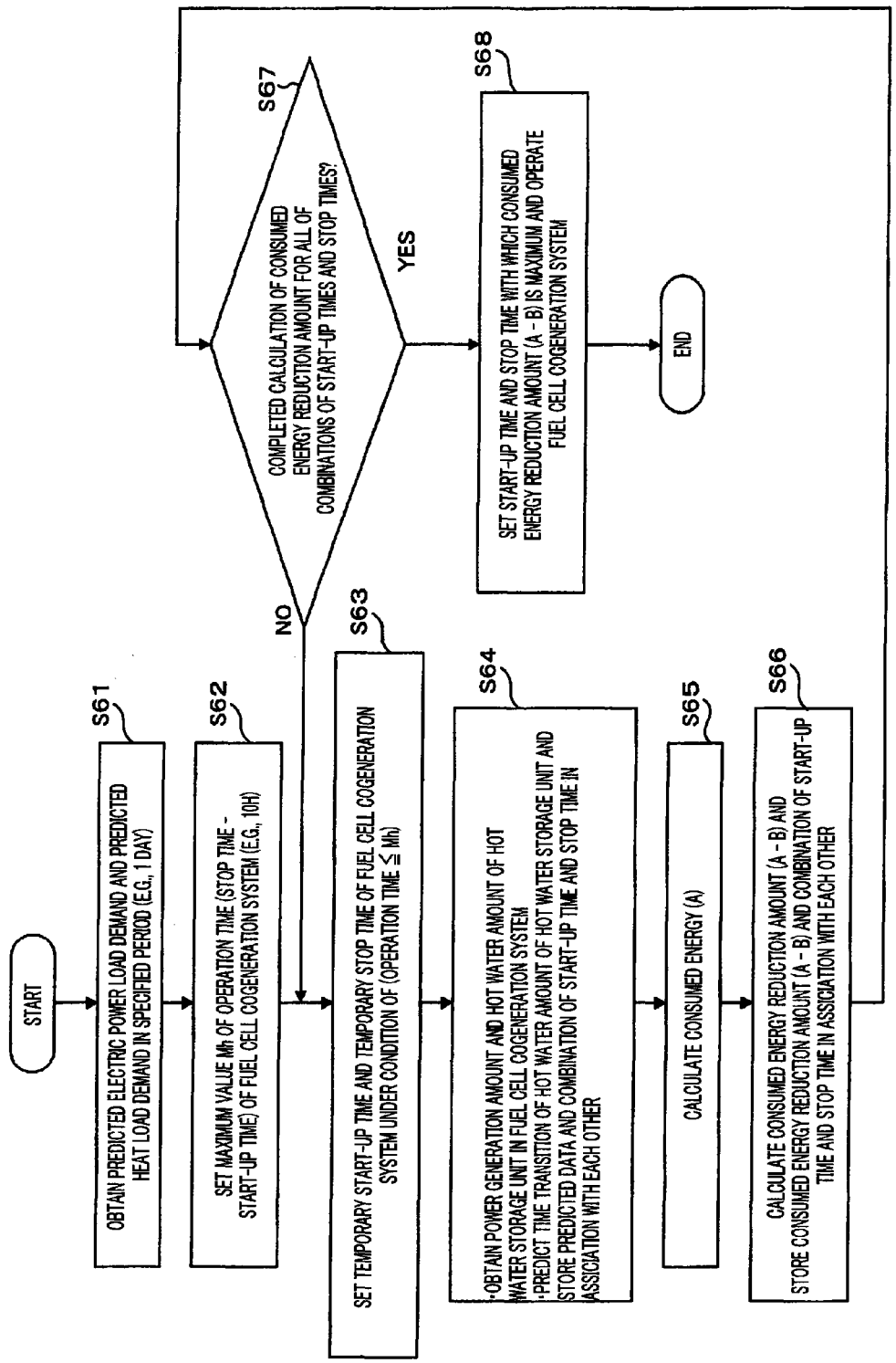
FIG. 12 is a flowchart showing an operation example of an energy supply system according to Embodiment 4.

FIG. 12 is a flowchart showing an operation example of the energy supply system according to this embodiment.

Initially, the operation planning device 6c of the controller 6 obtains predicted electric power load demand and predicted heat load demand in a specified period (e.g., 1 day) which are stored in the memory 6a (step S61).

Next, the operation planning device 6d sets maximum operation time Mh (10h) of the fuel cell system 1 in a specified period (e.g., 1 day) such that the operation time of the system 1 does not reach operation time life (e.g., 40000 hours) before a guaranteed operation period (e.g., 10 years) lapses (step S62), and then sets as a temporary start-up time and a temporary stop time, one combination of start-up time and stop time with which the operation time is equal to or shorter than Mh, from among a number of combinations of start-up times and stop times of the fuel cell system (step S63).

Then, the operation planning device 6c calculates a total of power generation amount generated by the fuel cell system 1 and a total of calories (hot water storage unit hot water supply amount) supplied to the hot water storage unit 1b by the fuel cell system 1 during an operation period in a case where the energy supply system is assumed to be operated from the temporarily set start-up time to the temporarily set stop time, based on the start-up time and the stop time of the fuel cell system 1 which are temporarily set in step S63, and the predicted electric power load demand and the predicted heat load demand in the specified period (e.g., 1 day) which are obtained from the memory 6a, and stores in the memory 6a, time transition of the hot water storage unit hot water supply amount predicted in calculation. The operation planning device 6c predicts time transition of hot water amount (hot water storage unit hot water amount) of the hot water storage unit 1b which is stored in the fuel cell system 1 based on the predicted heat load demand and the time-transitional predicted data of the hot water storage unit hot water supply amount which are obtained from the memory 6a, on the premise that the hot water is supplied to the heat load to cover the predicted heat load demand so long as hot water is left in the hot water storage tank, and stores in the memory 6a, this predicted data and the combination of the start-up time and stop time which are temporarily set, in association with each other. Then, the operation planning device 6c calculates consumed energy (B) of the fuel cell system 1 which is required to generate the above total of the power generation amount and of the hot water storage unit hot water supply amount during the operation period (step S64).

Then, the operation planning device 6c calculates consumed energy (A) using the power generation amount and the hot water storage unit hot water supply amount in the fuel cell system 1 during the operation period (between start-up time and stop time) which is predicted and temporarily set by the operation planning device 6c in step S63 (step S65).

Then, the operation planning device 6c calculates a numeric value (A–B) by subtracting the consumed energy (B) in step S63 from the consumed energy (A) in step S65, and stores in the memory 6a, the numeric value (A–B) and the combination of start-up time and stop time which are temporarily set in step S63, in association with each other, on assumption that the numeric value (A–B) is the consumed energy reduction amount of the fuel cell system 1 (step S66).

The operation planning device 6c determines whether or not it has completed calculation of the consumed energy reduction amount (A–B) for all of the combinations of start-up times and stop times with which the operation time is equal to or shorter than Mh (step S67). If the operation planning device 6c determines that it has not completed calculation of the consumed energy reduction amount (A–B) for all of the combinations of start-up times and stop times ("No" in step S67), it repeats step S63, step S64, step S65 and step S66, whereas if the operation planning device 6c determines that it has completed calculation of the consumed energy reduction amount (A–B) for all of the combinations of start-up times and stop times ("Yes" in step S67), the process moves to a next determination step.

Further, the operation planning device 6c reads and obtains, from the memory 6a, combination of start-up time and stop time with which the consumed energy reduction amount (A–B) is maximum, from among a plurality of combinations of start-up times and stop times which are stored in the memory 6a, in step S66, sets the obtained combination of start-up time and stop time in the fuel cell system 1, and under this condition, the fuel cell system 1 is operated (step S68).

As described above, in accordance with this embodiment, when selecting the combination of the temporary operation clock time and the temporary stop time of the fuel cell system in step S63 in the flowchart of FIG. 12, the combination of the operation clock time and the stop time is selected under the condition in which the operation time is equal to or shorter than Mh. This has an advantage that the number of times calculation in step S64 to S66 is repeated is less than in the fuel cell system of Embodiment 1, which makes it possible to fulfill suppressing of the operation time and reduction of the consumed energy amount, even when the memory 6a has a relatively small capacity.

The difference between the operation plan of the fuel cell system of this embodiment determined by the above method and the operation plan of the conventional fuel cell system is similar to the difference described in conjunction with the fuel cell system of Embodiment 1 with reference to FIGS. 3 and 4.

As should be understood from the above, the fuel cell system of this embodiment can implement a fuel cell system which can maximize a consumed energy reduction amount per unit operation time by operating the fuel cell system at the start-up time and the stop time of the system which are set by the operation planning device 6c under the condition in which the operation time is within the set maximum operation time of the system.

Although the maximum operation time is 10 hours in this embodiment, it is obvious that the optimal maximum operation time is sometimes different depending on the electric power load and heat load in an object for which the fuel cell system is installed, and a case where maximum operation time different from the maximum operation time of this embodiment is set is within the scope of the present invention (merely one example of the present invention).

Although the cogeneration system using the fuel cell is described as an example of the energy supply system, it is obvious that similar advantages are achieved in a monogeneration system utilizing only a power generation function of a fuel cell, in an engine energy supply system using an engine, or in a turbine-type power generation system for generating electric power by rotating a turbine with a gas.

Embodiment 5

A fuel cell system according to Embodiment 5 of the present invention is configured to include constituents similar to those of Embodiment 1 and will be described with reference to FIGS. 1 and 8, and the similar constituents will not be described repetitively.

An operation example of the energy supply system of this embodiment will be described with reference to FIG. 13.

Initially, the operation planning device 6c of the controller 6 obtains predicted electric power load demand and predicted heat load demand in a specified period (e.g., 1 day) which are stored in the memory 6a (step S401).

The predicted electric power load demand and the predicted heat load demand may be predicted demands based on typical electric power and typical heat load heat consumption history which are pre-stored in the memory 6a when the fuel cell system 1 installed at home is placed in a stationary state or may be predicted demands based on electric power load and heat load heat consumption history which are modified by the demand predictor 6b with a lapse of the operation of the fuel cell system 1, to be compatible with a life cycle of each home.

Next, the operation planning device 6d sets maximum operation time Mh (e.g., 10 hours) of the fuel cell system 1 in a specified period (e.g., 1 day) such that the operation time does not reach operation time life (e.g., 40000 hours) before a guaranteed operation period (e.g., 10 years) lapses (step S402), and then sets as a temporary start-up time and a temporary stop time, one of a number of combinations of start-up times and stop times of the fuel cell system 1 (step S403).

Then, the operation planning device 6c calculates a total of a power generation amount generated by the fuel cell system 1 and a total of calories (hot water amount corresponding to the calories; hereinafter referred to as "hot water storage unit hot water supply amount)" supplied to the hot water storage unit 1b by the fuel cell system 1 during an operation period in a case where the energy supply system is assumed to be operated between the temporarily set start-up time and the temporality set stop time, based on the start-up time and stop time which are temporarily set in step S403, and the predicted electric power load demand and the predicted heat load demand in the specified period (e.g., 1 day) which are obtained from the memory 6a, and stores in the memory 6a, time transition of the hot water storage unit hot water supply amount predicted in calculation. The operation planning device 6c predicts time transition of hot water amount (hereinafter referred to as "hot water storage unit hot water amount") of the hot water storage unit 1b which is stored in the fuel cell system 1 based on the predicted heat load demand and the time-transitional predicted data of the hot water storage unit hot water supply amount, which are obtained from the memory 6a, on the premise that the hot water is supplied to the heat load to cover the predicted heat load demand so long as hot water is left in the hot water storage tank, and stores in the memory 6a, this predicted data and the combination of the start-up time and stop time which are temporarily set, in association with each other. Then, the operation planning device 6c calculates consumed energy (B) of the fuel cell system 1 which is required to generate the above total of the power generation amount and of the hot water storage unit hot water supply amount during the operation period (step S404).

The consumed energy (B) is a rough indication of consumed energy reduction at home when the fuel cell system 1 is introduced into home, and refers to a raw material energy (total energy of a material gas consumed by the operation of the fuel cell system 1, operational electric power of the fuel cell system 1, etc) which is required to operate the fuel cell system 1 when the above power generation amount and the above hot water storage unit hot water supply amount are generated.

Then, the operation planning device 6c calculates consumed energy (A) using the power generation amount and the hot water storage unit hot water supply amount in the fuel cell system 1 during the operation period (between start-up time and stop time) which is predicted and temporarily set by the operation planning device 6c in step S403 (step S405).

The consumed energy (A) is a reference of a consumed energy reduction amount at home when the fuel cell system 1 is introduced into home, and refers to total energy in a case where the whole of the power generation amount and hot water storage unit hot water supply amount of the fuel cell system 1 which are predicted by the operation planning device 6c are assumed to be covered by electric power and gas supplied by existing infrastructure of electric power company and gas company rather than the fuel cell system 1.

Then, the operation planning device 6c calculates a numeric value (A–B) by subtracting the consumed energy (B) in step S403 from the consumed energy (A) in step S405, and stores in the memory 6a, the numeric value (A–B) and the combination of start-up time an stop time which are temporarily set in step S403, in association with each other, on assumption that the numeric value (A–B) is the consumed energy reduction amount of the fuel cell system 1 (step S406).

The operation planning device 6c determines whether or not it has completed calculation of the consumed energy reduction amount (A–B) for all of the combinations of start-up times and stop times (step S407). If the operation planning device 6c determines that it has not completed calculation of the consumed energy reduction amount (A–B) for all of the combinations of start-up times and stop times ("No" in step S407), it repeats step S403, step S404, step S405 and step S406, whereas if the operation planning device 6c determines that it has completed calculation of the consumed energy reduction amount (A–B) for all of the combinations of start-up times and stop times ("Yes" in step S407), the process moves to a next determination step.

Further, the operation planning device 6c reads from the memory 6a, combination of start-up time and stop time with which the consumed energy reduction amount (A–B) is maximum, from among a plurality of combinations of start-up times and stop times which are stored in the memory 6a, in step S406, and sets the read combination (step S408).

Then, the operation planning device 6c determines whether or not the maximum operation time Mh set in step S402 is applied to the combination of start-up time and stop time set in step S408, based on a predetermined condition (step S488). If the condition is not met ("No" in step S488), the process moves to a next determination step.

The operation planning device 6c reconfigures a start-up time and a stop time with which the consumed energy reduction amount (A–B) per unit operation time is maximum when the operation time of the fuel cell cogeneration system is limited to Mh, from among the start-up times and stop times of the fuel cell system 1 which are set in step S408, and under this condition, the fuel cell system 1 is operated (step S409).

On the other hand, if the condition is met in step S488 ("Yes" in step S488), the fuel cell system 1 is operated at the start-up time and stop time which are set in step S408 (step S499).

As described above, the maximum operation time Mh is desirably set according to the statuses of electric power load and heat load. In winter season or the like when the electric power load significantly increases and the heat load is large, since the operation time allowing for efficiently reducing consumed energy is limited by setting the maximum operation time and a ratio of an energy loss necessary for start-up and stop per unit operation time is large, setting the maximum operation time is undesirable to maximization of the consumed energy reduction amount per unit operation time, and it is possible to maximize the consumed energy reduction amount per unit time by relatively setting the maximum operation time longer in the case of the above described condition. For this reason, if the maximum operation time is equal to or longer than the specified period, in step S1, it is not necessary to limit the operation time by the maximum operation time. Therefore, in step S488, it is determined whether or not to limit the operation time by the maximum operation time Mh.

It is desirable to determine whether or not to limit the operation time by the maximum operation time based on environmental conditions such as calendar information such as a calendar or season information composed of calendars, as factors closely related to the magnitude of the electric power load and the magnitude of the heat load (e.g., for three months of December, January, and February, the operation time is not limited by the maximum operation time). Although not shown, the controller 6 contains a real time counter for managing the calendar information such as the calendar and the season information. Based on these information, it is determined whether or not to limit the operation time by the maximum operation time in step S488. Like the remote controller 7 of FIG. 8, the real time counter may be built into the fuel cell 1a or the hot water storage unit 1b, or may be a separate device. In that case, the real time counter is configured to transmit information to the controller 6 by communication or the like.

The outside air temperature and the city water temperature, as the factors closely related to the magnitude of the electric power load and the magnitude of the heat load, are effectively used as the environmental conditions. Although not shown, the controller 6 contains temperature sensors configured to manage the outside air temperature and the city water temperature. Based on the information, it is determined whether or not to limit the operation time by the maximum operation time in step S488 (e.g., the operation time is not limited by the maximum operation time when the outside air temperature is 10 degrees C. or lower). Like the remote controller 7 of FIG. 8, the temperature sensors may be built into the fuel cell 1a or the hot water storage unit 1b, or may be separate devices. In that case, the temperature sensors are configured to transmit information to the controller 6 by communication or the like.

There may be provided a means via which the user can input environmental conditions (e.g., energy consumption information such as season information, calendar information, outside air temperature information, city water temperature, family member information, guest information, etc) closely related to the magnitude of the electric power load demand and the magnitude of the heat load demand, and the user may input them as desired via the means, which results in an advantage. Although not shown, the controller 6 contains the environmental condition input means. Based on the information, the controller 6 commands power generation. Like the remote controller 7 of FIG. 8, the environmental condition input means may be built into the fuel cell 1a or the hot water storage unit 1b, or may be a separate device. In that case, the environmental condition input means is configured to transmit information to the controller 6 by communication or the like.

As described above, in accordance with the fuel cell system of this embodiment, in summer season or the like, it is possible to maintain a large consumed energy reduction amount while suppressing the operation time by setting the maximum operation time of the system, while in winter season or the like, it is possible to maintain a large consumed energy reduction amount by configuring the setting such that the operation time is not limited by the maximum operation time and the operation time is not suppressed.

Although in this embodiment, the maximum operation time Mh is set in step S2 and it is determined whether or not to limit the operation time by the maximum operation time Mh in step S488, it is obvious that a case where it is determined whether or not to limit the operation time in setting of the maximum operation time Mh in step S2 can achieve similar advantages and is within the scope of the present invention (merely one example of this invention).

Although the cogeneration system using the fuel cell is described as an example of the energy supply system, it is obvious that similar advantages are achieved in a monogeneration system using only a power generation function of the fuel cell, in an engine energy supply system using an engine, or in a turbine-type power generation system for generating electric power by rotating a turbine with a gas.

Modification Example 5

Figure 13:
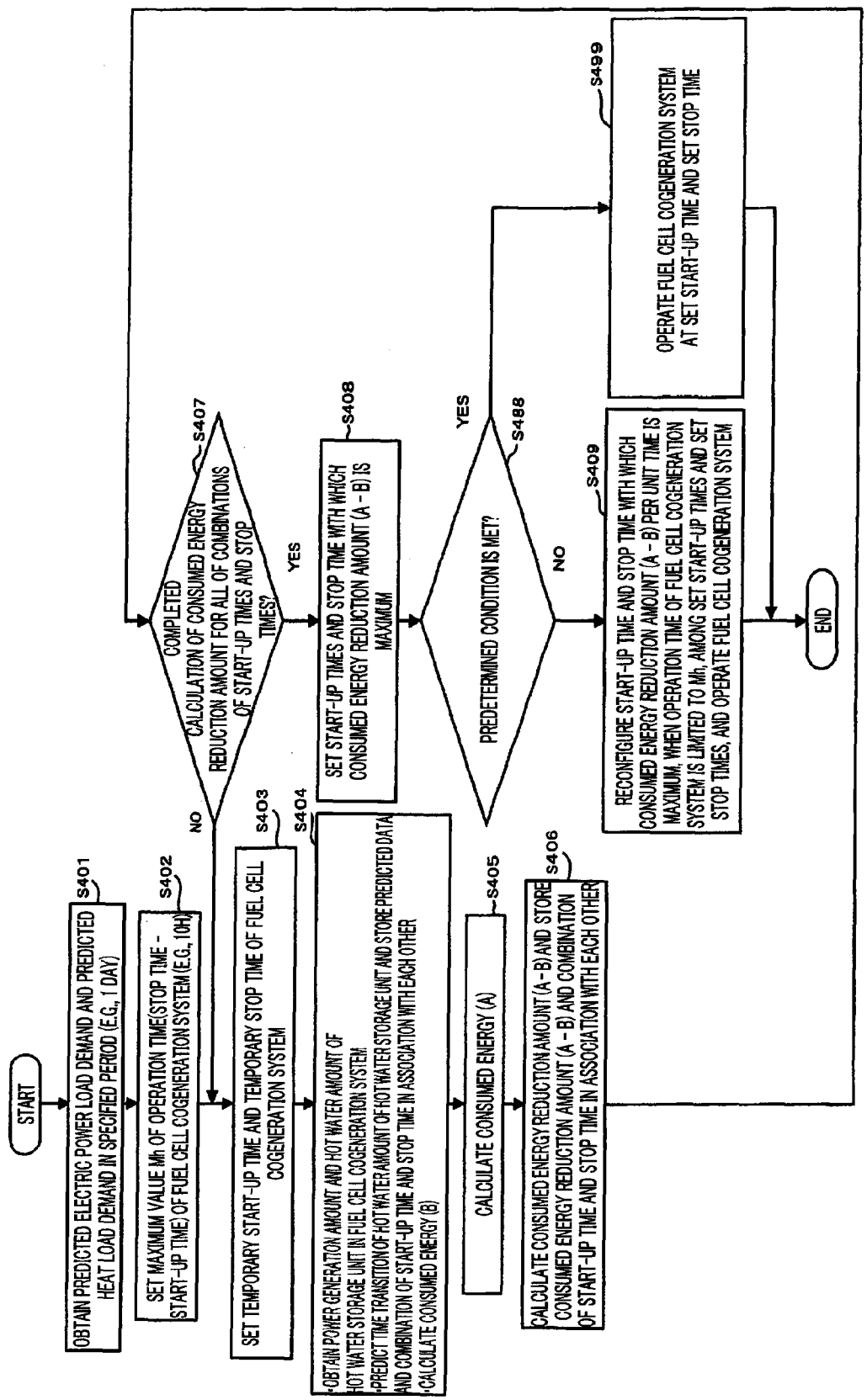
FIG. 13 is a flowchart showing an operation example of an energy supply system according to Embodiment 5.

In this embodiment, the example of the operation plan of the fuel cell system 1 has been described, in which in step S488 in the flowchart of FIG. 13, it is determined whether or not to limit the operation time by the maximum operation time Mh based on the environmental conditions such as the season information, the calendar information, the outside air temperature information, or the city water temperature information.

Alternatively, it may be determined whether or not to limit the operation time based on the status of the fuel cell system 1, as well as the environmental conditions. Only the predetermined condition in step S488 in the flowchart of FIG. 13 is different and the other steps are identical and will not be described repetitively.

As described above, the maximum operation time Mh is desirably set depending on the status of the fuel cell system 1. When an operation efficiency of the system before degradation of performance of the system occurs is high, the operation time allowing for efficiently reducing the consumed energy is limited by setting the maximum operation time and a ratio of an energy loss required for start-up and stop per unit operation time is large. Therefore, setting the maximum operation time is undesirable to maximization of the consumed energy reduction amount per unit operation time, and it is possible to maximize the consumed energy reduction amount per unit operation time by setting the maximum operation time relatively longer in the case of the above condition. For this reason, if the maximum operation time is equal to or longer than the specified period, in step S1, it is not necessary to limit the operation time by the maximum operation time. Therefore, in step S488, it is determined whether or not to limit the operation time by the maximum operation time Mh.

It is desirable to determine whether or not to limit the operation time by the maximum operation time based on system operation history information from when a power supply is ON after installation, such as total energization time and total power generation time as factors closely related to the operation efficiency of the system (e.g., the operation time is not limited by the maximum operation time when the total power generation time is less than 20000 hours). Although not shown, the controller 6 contains a real time counter for managing the system operation history information such as the total energization time and the total power generation time. Based on the information, it is determined whether or not to limit the operation time by the maximum operation time in step S488. Like the remote controller 7 of FIG. 8, the real time counter may be built into the fuel cell 1a or the hot water storage unit 1b, or may be a separate device. In that case, the real time counter is configured to transmit information to the controller 6 by communication or the like.

It is desirable to determine whether or not to limit the operation time by the maximum operation time based on life years from the time point of manufacture in factories, as factors closely related to the operation efficiency of the system (e.g., the operation time is not limited by the maximum operation time when the years from the point of manufacture in factories is less than 5 years). Although not shown, the controller 6 contains a real time counter for managing the life years of the system, and based on the information, it is determined whether or not to limit the operation time by the maximum operation time in step S488. Like the remote controller 7 of FIG. 8, the real time counter may be built into the fuel cell 1a or the hot water storage unit 1b, or may be a separate device. In that case, the real time counter is configured to transmit information to the controller 6 by communication or the like.

It is desirable to determine whether or not to limit the operation time by the maximum operation time based on the operation efficiency of the system which is directly monitored (e.g., the operation time is not limited by the maximum operation time before the operation efficiency decreases by 30% from initial efficiency). Although not shown, the controller 6 contains a real time counter for managing the operation efficiency of the system, and based on the information, it is determined whether or not to limit the operation time in step S488. Like the remote controller 7 of FIG. 8, the real time counter may be built into the fuel cell 1a or the hot water storage unit 1b, or may be a separate device. In that case, the real time counter is configured to transmit information to the controller 6 by communication or the like.

In accordance with the fuel cell system of this embodiment, the maximum operation time is set at a later stage of the life when the operation efficiency of the system decreases and it is possible to maintain a large consumed energy reduction amount while suppressing the operation time. In addition, at an initial stage of the life when the operation efficiency of the system has not decreased yet, limiting the operation time by the maximum operation time is not performed and the operation time is not suppressed, thereby maintaining a large consumed energy reduction amount.

Further, since it is determined whether or not to limit the operation time by the maximum operation time based on the life years from the time point of manufacture in factories, it is possible to maintain a large consumed energy reduction amount in view of a decrease in the operation efficiency in a stock state after the manufacture.

Although in this embodiment, the maximum operation time Mh is set in step S2 and it is determined whether or not to limit the operation time by the maximum operation time Mh in step S488, it is obvious that a case where it is determined whether or not to limit the operation time by the maximum operation time Mh in setting the maximum operation time Mh in step S2 can achieve similar advantages and is within the scope of the present invention (merely an example of the present invention).

Although the cogeneration system using the fuel cell is described as an example of the energy supply system, it is obvious that similar advantages are achieved in a monogeneration system utilizing only a power generation function of a fuel cell, in an engine energy supply system using an engine, or in a turbine-type power generation system for generating electric power by rotating a turbine with a gas.

Other Embodiments

As should be appreciated from the foregoing description, the energy supply system of the present invention may be configured as follows.

The energy supply system of the present invention may be configured to include an energy supply system which supplies at least one of electric power and heat and an operation planning device which sets the maximum operation time for which the energy supply system is operative in a specified period constituting the guaranteed operation period such that the operation time of the system does not reach the operation time life before the guaranteed operation period lapses.

In accordance with the energy supply system configured as described above, the energy supply system can continue the operation while preventing the operation time from reaching the operation time life before the guaranteed operation period lapses.

The energy supply system of the present invention may be configured such that the maximum operation time is a constant value.

The energy supply system of the present invention may be configured such that the maximum operation time changes according to a predetermined condition.

The energy supply system of the present invention may be configured such that the predetermined condition is at least one of calendar information, season information, an outside air temperature, and a city water temperature.

The energy supply system of the present invention may be configured such that the specified period is at least one of day(s), week(s), month(s), and year(s).

The energy supply system of the present invention may be configured such that the specified period changes according to a predetermined pattern.

The energy supply system of the present invention may be configured to include an operation planning device which plans the operation of the energy supply system, and the operation planning device may plan the operation of the energy supply system such that an energy reduction amount per unit operation time under the condition in which the operation time is within the maximum operation time is maximum.

The energy supply system of the present invention may be configured to include an operation planning device which plans the operation of the energy supply system, and the operation planning device may plan the operation of the energy supply system such that an energy reduction amount per unit time in the specified period under the condition in which the operation time is within the maximum operation time is maximum.

The energy supply system of the present invention may be configured to include an operation planning device which plans the operation of the energy supply system, and the operation planning device may plan the operation of the energy supply system such that an energy reduction amount in a predetermined period under the condition in which the operation time is within the maximum operation time is maximum.

The energy supply system of the present invention may be configured to include an operation planning device which plans the operation of the energy supply system, and the operation planning device may plan the operation of the energy supply system such that an energy consumption amount of the energy supply system is minimum.

The energy supply system of the present invention may be configured to determine a predetermined operation pattern such that a consumed energy reduction amount of an object to which the energy supply system supplies energy is maximum.

The energy supply system of the present invention may be configured to include an operation device which is operated by a user to input a start-up time and a stop time of the energy supply system, and an operation clock time setting device which sets the start-up time and the stop time which are input via the operation device by the user as the start-up time and the stop time of the energy supply system, and the operation clock time setting device may be configured not to set the start-up time and the stop time input via the operation device as the start-up time and the stop time of the energy supply system if the operation time from the start-up time input via the operation device to the stop time input via the operation device exceeds the maximum operation time.

The energy supply system of the present invention may be configured such that the operation device may display on a screen thereof, information indicating that the operation time from the start-up time input via the operation device to the stop time input via the operation device exceeds the maximum operation time, if the operation time exceeds the maximum operation time.

The energy supply system of the present invention may be configured such that the operation planning device updates the maximum operation time based on the integrated operation time of the energy supply system.

In the energy supply system of the present invention, elements and matters recited in the above embodiments and modification examples may be combined as desired and suitably. It is needless to say that desired advantages are achieved according to the respective combinations.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

An energy supply system of the present invention can continue operation while preventing operation time from reaching operation time life before a guaranteed operation period lapses, and is useful as, for example, a home energy supply system.

REFERENCE SIGNS LIST 1 fuel cell system
1a fuel cell unit
1b hot water storage unit
2 electric power system
3 electric power consumption device
4 electric power meter
5 calorimeter
6 controller
6a memory
6b demand predictor
6c operation planning device
7 remote controller

What is claimed is:

1. An energy supply system comprising:
an energy supply device for supplying at least one of electric power and heat; and
a controller configured to set first maximum operation time which is an upper limit value of operation time of the energy supply device in a first specified period shorter than a guaranteed operation period of the energy supply device such that operation time of the energy supply device does not reach operation time life before the guaranteed operation period lapses, and calculate and set second maximum operation time which is an upper limit value of operation time of the energy supply device in a second specified period shorter than the first specified period based on the set first maximum operation time such that the operation time of the energy supply device within the first specified period does not exceed the first maximum operation time.

2. The energy supply system according to claim 1,
wherein the controller is configured to operate the energy supply device such that the number of times of start-up and stop in the second specified period is limited to less than a predetermined number of times.

3. The energy supply system according to claim 1,
wherein the first maximum operation time and/or the second maximum operation time is/are constant value(s).

4. The energy supply system according to claim 1,
wherein the controller is configured to change the first maximum operation time and/or the second maximum operation time according to a predetermined condition.

5. The energy supply system according to claim 3,
wherein the predetermined condition is at least one of calendar information, season information, an outside air temperature, and a city water temperature.

6. The energy supply system according to claim 1,
wherein the first specified period is one of n day(s), n week(s), n month(s) and n year(s) when n is a natural number.

7. The energy supply system according to claim 1,
wherein the second specified period is one of n hour(s), n day(s), n week(s), n month(s) and n year(s) when n is a natural number.

8. The energy supply system according to claim 1,
wherein the controller is configured to change the first specified period according to a predetermined pattern.

9. The energy supply system according to claim 1,
wherein the controller is configured to set the first maximum operation time and the second maximum operation time such that an energy cost reduction amount per unit operation time is maximum.

10. The energy supply system according to claim 1,
wherein the controller is configured to set the first maximum operation time and the second maximum operation time such that a consumed energy amount of the energy supply device is minimum.

11. The energy supply system according to claim 1,
wherein the controller is configured to set the first maximum operation time and the second maximum operation time such that a consumed energy reduction amount of an object to which the energy supply device supplies energy is maximum.

12. The energy supply system according to claim 1, further comprising:
an operation device via which a start-up time and a stop time of the energy supply device are input;
wherein the controller is configured to set the start-up time and the stop time which are input via the operation device, as a device start-up time and a device stop time which are a start-up time and a stop time of the energy supply device, respectively, if time from the start-up time input via the operation device to the stop time input via the operation device does not exceed the second maximum operation time; and wherein the controller is configured not to set the start-up time and the stop time which are input via the operation device, as the device start-up time and the device stop time, if the time from the start-up time input via the operation device to the stop time input via the operation device exceeds the second maximum operation time.

13. The energy supply system according to claim 11, further comprising:

an informing device configured to inform that, if the time from the start-up time input via the operation device to the stop time input via the operation device exceeds the second maximum operation time, the time exceeds the second maximum operation time.

14. The energy supply system according to claim 1, wherein the controller is configured to update the first maximum operation time based on an integrated operation time of the energy supply device.

15. The energy supply system according to claim 14, wherein the controller is configured to calculate and integrate a difference between the second maximum operation time and operation time of the energy supply device within the second specified period to obtain integrated surplus operation time, and store the integrated surplus operation time, when the operation time of the energy supply device within the second specified period is shorter than the second maximum operation time.

16. The energy supply system according to claim 14, wherein the controller is configured to reconfigure the first maximum operation time when the integrated surplus operation time reaches a preset third specified period.

* * * * *